United States Patent [19]

Koerner et al.

[11] 3,943,339
[45] Mar. 9, 1976

[54] INDUCTIVE LOOP DETECTOR SYSTEM

[75] Inventors: Ralph J. Koerner; Milton G. Bienhoff; Martin C. Henderson, all of Canoga Park; John E. Higbee, Santa Susana; Steve J. Koerner, Van Nuys, all of Calif.

[73] Assignee: Canoga Controls Corporation, Canoga Park, Calif.

[22] Filed: Apr. 29, 1974

[21] Appl. No.: 465,031

[52] U.S. Cl. ........ 235/92 TC; 235/92 ST; 235/92 R; 340/38 L
[51] Int. Cl.² .................... G08G 1/065; G08G 1/08
[58] Field of Search ....... 235/92 ST, 92 TC, 150.24; 340/38 L

[56] References Cited
UNITED STATES PATENTS

| | | | |
|---|---|---|---|
| 3,651,452 | 3/1972 | Friedman | 340/38 L |
| 3,795,907 | 3/1974 | Edwards | 235/92 ST |
| 3,863,206 | 1/1975 | Rabie | 340/38 L |
| 3,868,626 | 2/1975 | Masher | 340/38 L |

*Primary Examiner*—Joseph M. Thesz, Jr.
*Attorney, Agent, or Firm*—Lindenberg, Freilich, Wasserman, Rosen & Fernandez

[57] ABSTRACT

Apparatus for use in combination with multiple inductive loops for detecting metal objects, e.g. vehicles, in the immediate vicinity of each of said loops. Each loop may, for example, be a coil of wire buried in a roadway in a plane parallel to the roadway surface. A common oscillator circuit is operatively connected to each loop on a time shared basis with the frequency of oscillation at any time being determined by the inductance of the connected loop. The inductance in turn is dependent on whether or not a vehicle is over the loop. Successive scan cycles are defined with multiple loop phases occurring during each scan cycle. During each loop phase, a different one of the multiple loops is connected to the oscillator circuitry and during a "period measurement" portion of each loop phase, the loop frequency is monitored by digital circuitry including a loop counter which counts loop oscillator cycles and a duration counter which measures the time duration or period of a certain number of such loop oscillator cycles. The measured time duration (period) is then compared with an historical reference duration (accumulated over prior scan cycles) during a "calculation and storage" portion of each loop phase to ascertain whether the loop oscillator frequency has increased or decreased. The presence of a vehicle over the loop decreases loop inductance, increases loop frequency, and thus reduces the measured period. A reduction in the measured period by an amount greater than a preselected threshold produces an output signal or "call" to indicate the vehicle's presence. In order to accommodate loop inductance variations attributable to slowly varying environmental conditions, the historical reference duration is caused to vary or "adapt" over a plurality of scan cycles in accordance with certain defined criteria. The duration counter counts cycles of a crystal oscillator and is used during each "period measurement" portion to measure a time duration and during each "calculation and storage" portion to define sequential control states for the performance of various arithmetic and logic operations.

42 Claims, 14 Drawing Figures

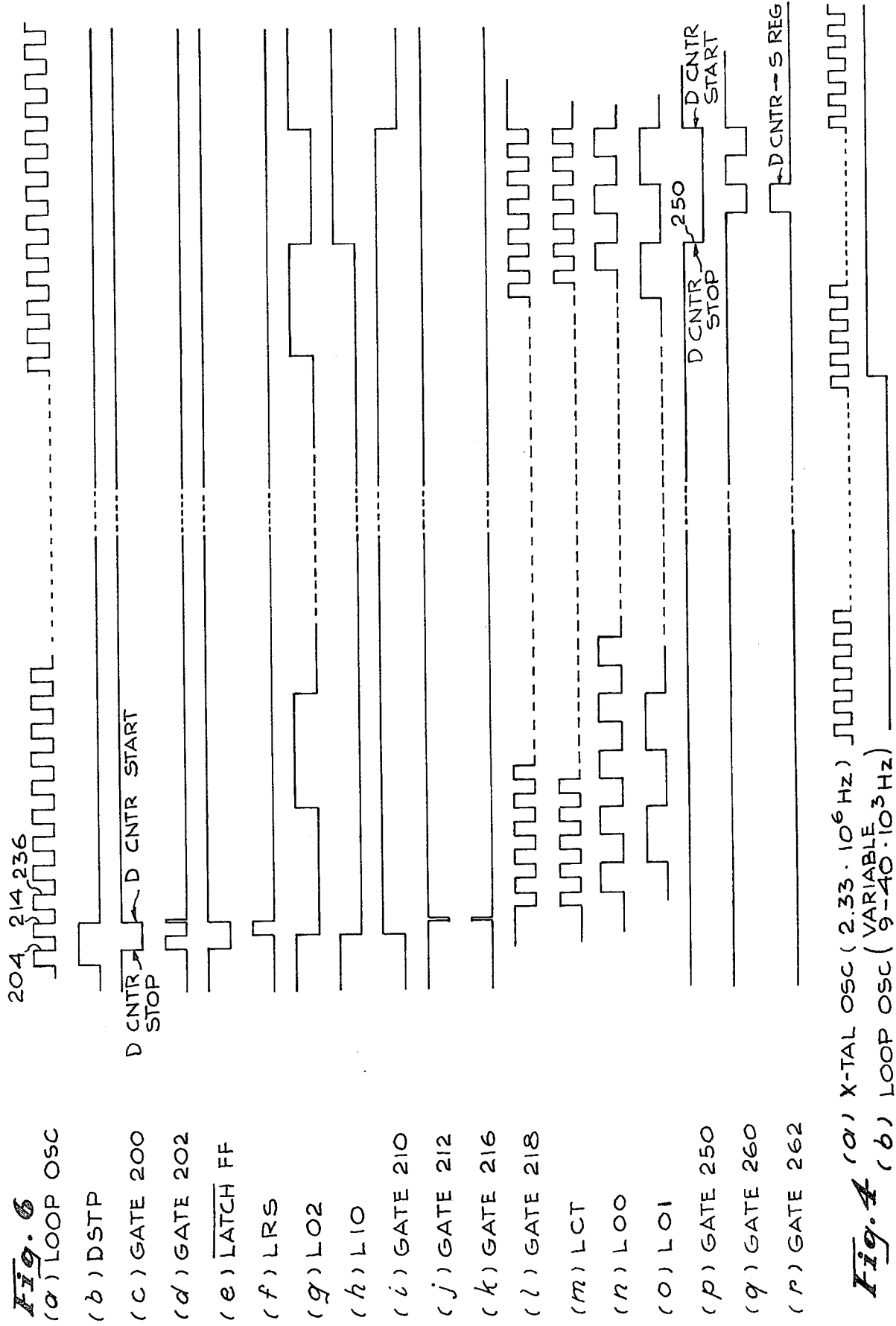

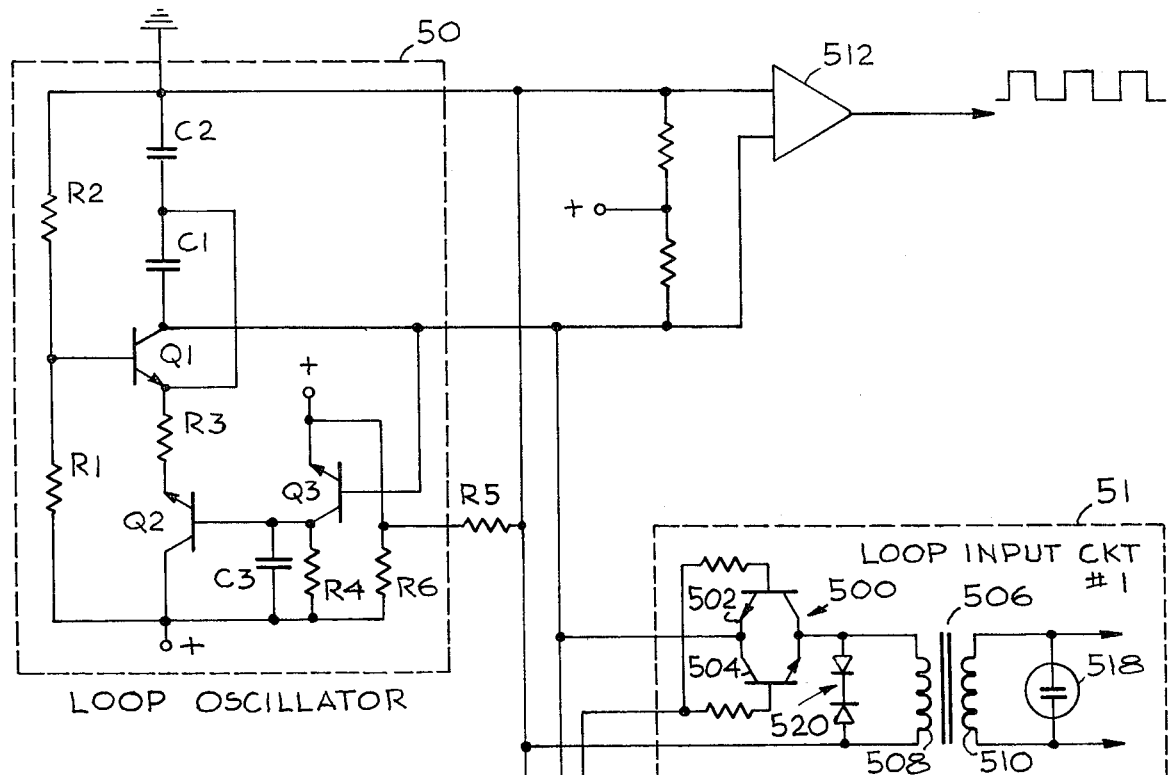
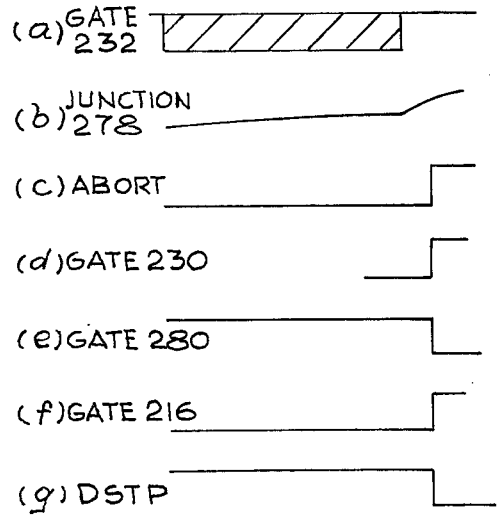
Fig. 7
Fig. 14

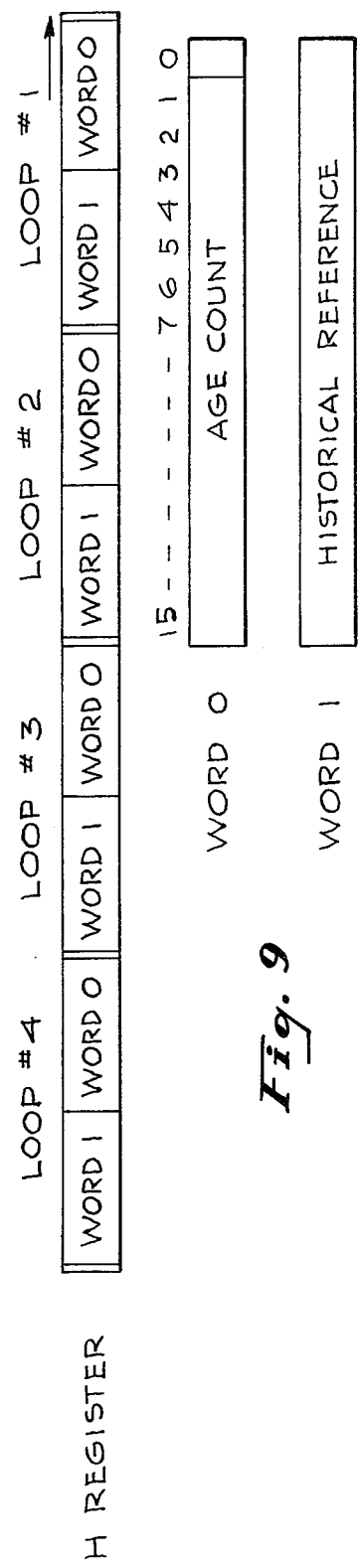
Fig. 9
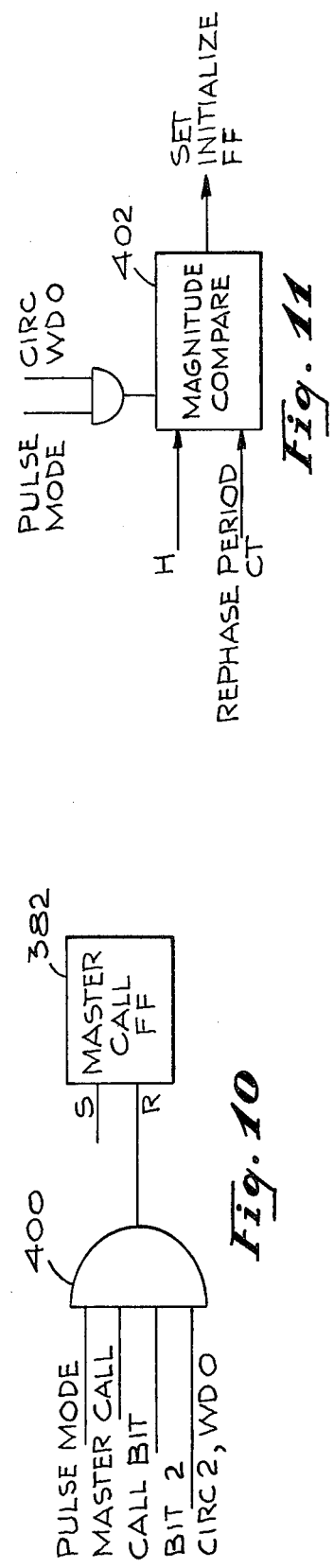
Fig. 11
Fig. 10
Fig. 12
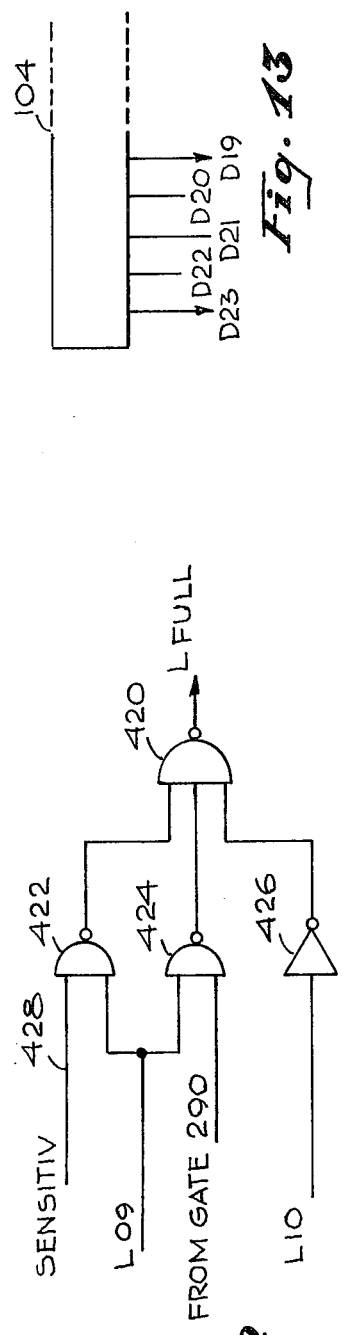
Fig. 13

INDUCTIVE LOOP DETECTOR SYSTEM

BACKGROUND OF THE INVENTION

This invention relates generally to metal object detection and more particularly to an inductive loop detector suitable for detecting the passage or presence of a vehicle over a defined area of roadway.

Inductive loop detectors have been widely used for several years in various applications to detect the presence or passage of a vehicle. For example, such detectors have been used in traffic actuated control systems for developing the input data required by a controller to control signal lights. In another typical application, a detector may be connected to a counter which functions to accumulate a count of vehicle flow past a certain point.

Various types of inductive loop detectors suitable for traffic applications are known in the prior art. Each detector generally comprises electronic circuitry which operates in conjunction with a loop (i.e., a wire coil) buried in the roadway in a plane substantially parallel to the roadway surface. The circuitry includes components which, together with the loop, form an oscillator whose frequency is dependent on the loop inductance. The loop inductance is in turn dependent on whether or not the loop is loaded by the presence of a vehicle. A vehicle over the loop decreases loop inductance and thus increases the frequency of oscillation. The circuitry monitors the oscillator frequency and generates a call (i.e., vehicle present signal) when a sufficient frequency change is detected. Different techniques have been employed in prior art detectors for monitoring the oscillator frequency but generally, analog circuitry using filters and phase detectors has been employed.

U.S. Pat. application Ser. No. 444,519 now abandoned, assigned to the same assignee as the present application discloses an improved inductive loop detector which employs digital circuitry to monitor the inductance of a loop. The digital circuitry defines sequential detect cycles and during each detect cycle, a digital counter (sometimes referred to as the loop counter) counts cycles of the loop oscillator signal. Concurrently, a second digital counter (sometimes referred to as the duration counter) measures the duration or period of a predetermined number of loop signal cycles by counting pulses provided by a stable clock pulse source. The measured duration is then compared with a reference duration (whose value is accumulated during prior detect cycles in accordance with predetermined criteria) and the difference is indicative of a change in loop signal frequency and thus also a change in loop inductance. A threshold means then determines whether the change is of sufficient magnitude to generate a call. In accordance with an important aspect of the detector disclosed in Ser. No. 444,519 now abandoned, the difference (sometimes called deviation) between the measured and reference durations is utilized as an error input to modify (i.e., servo) the reference duration toward the measured duration to thus allow the detector to self-tune or adapt to varying environmental conditions. The rate of adapting is dependent on the magnitude and direction of the deviation.

SUMMARY OF THE INVENTION

The present invention is directed to improved detection apparatus in which common oscillator and digital logic circuitry is efficiently time shared between multiple independent loop channels so as to optimize the utilization of equipment and avoid crosstalk between loop channels.

Briefly, the inductive loop channels are each connected in sequence to the common loop oscillator circuitry and while each is connected, a sample is taken of the frequency of loop oscillation. This sample is then promptly compared with a stored historical reference developed during one or more earlier time periods to determine whether the loop frequency has changed and if so, whether the change is sufficient to constitute a call condition.

In accordance with a preferred embodiment of the invention, a multiple stage cyclic binary counter (D counter) is provided for counting pulses supplied by a stable crystal oscillator. For exemplary purposes only, the D counter will be assumed to comprise 19 stages D00–D18. One complete cycle of the D counter defines a scan cycle. The two most significant stages of the D counter (D17, D18) define four different loop phases within each scan cycle and during each loop phase a different inductive loop is connected to the common loop oscillator circuitry. The loop oscillator circuitry typically oscillates at a frequency on the order of 9-40 KHz and the crystal oscillator oscillates at a much higher rate, e.g. 2.33 MHz.

Each loop phase consists of a period measurement portion and a calculation and storage portion. During the period measurement portion, the D counter measures the elapsed time or period (by counting crystal oscillator cycles) of a certain number of loop oscillator cycles. Loop oscillator cycles are counted by a multiple stage cyclic binary counter (L counter) which for exemplary purposes will be assumed to consist of 11 stages (L00–L10). Each period measurement portion is initiated with the L counter at zero and terminated when the L counter reaches a predetermined L-end count. When the L counter starts counting loop cycles, the D counter starts counting crystal cycles from a D-start count. When the L-end count is reached, the count in the D counter, which represents the period, is transferred to a sample register (S register) for processing during the calculation and storage portion.

The D counter is used to control sequential arithmetic and logic operations during the calculation and storage portion. When the D counter reaches a D-end count, the coupling between the crystal oscillator and D counter is disabled and the D counter waits at the D-start count for synchronization with the L counter and a subsequent loop phase then begins.

During the calculation and storage portion, the sample in the S register is compared with an historical reference period stored in an H register to effect certain actions in the event certain criteria are satisfied. Briefly, these actions can involve generating or canceling a call and modifying the stored historical reference period.

In accordance with one significant feature of the invention, channel crosstalk is eliminated by operating only one loop channel at a time and time sharing common oscillator and logic circuitry.

In accordance with a further feature of the invention, a common loop oscillator circuit is provided incorporating means for regulating the amplitude of oscillation.

In accordance with a further feature of the invention, multiple loop input circuits are provided each constituting part of a different loop channel for coupling one or more roadway loops to the common oscillator and logic circuitry. Each loop input circuit includes an electronic switch and a transformer for coupling the roadway loop to the oscillator circuitry.

In accordance with a further feature of the invention, means are provided for operating in a PULSE mode to produce a single output pulse regardless of the length of time a vehicle is over a loop in a PRESENCE mode to produce a continuous signal corresponding to the length of time the vehicle is over the loop.

In accordance with a further feature of the invention, means are provided for rapidly establishing an initial historical reference in the event of sudden loop inductance changes or power interruptions.

BRIEF DESCRIPTION OF THE DRAWINGS

FIG. 4 is a timing diagram generally illustrating the frequency relationship between the outputs of the crystal oscillator and loop oscillator;

FIG. 6 is a timing diagram illustrating the various logic signal occurring within the period measurement logic of FIG. 5 during a typical period measurement portion of a loop phase;

FIG. 7 is a timing diagram illustrating logic signals occuring within the logic diagram of FIG. 5 particularly applicable to the functioning of the NOT ABORT flip flop therein;

FIG. 9 is a diagram illustrating the bit format of the H register of FIG. 2;

FIG. 10 is a block diagram illustrating the logic circuitry employed during the pulse mode to generate a single output pulse;

FIG. 11 is a block diagram illustrating the logic circuitry employed during the pulse mode to enable the system to disregard a vehicle parked over one loop and to still respond to other loops connected on the same channel;

FIG. 12 is a block diagram illustrating the logic circuitry employed to vary sensitivity by effectively varying the number of loop oscillator cycles counted during a period measurement operation;

FIG. 13 is a diagram representing additional D counter stages; and

FIG. 14 is a circuit diagram illustrating a preferred oscillator circuit and loop input circuit.

DESCRIPTION OF THE PREFERRED EMBODIMENTS

Figure 1:
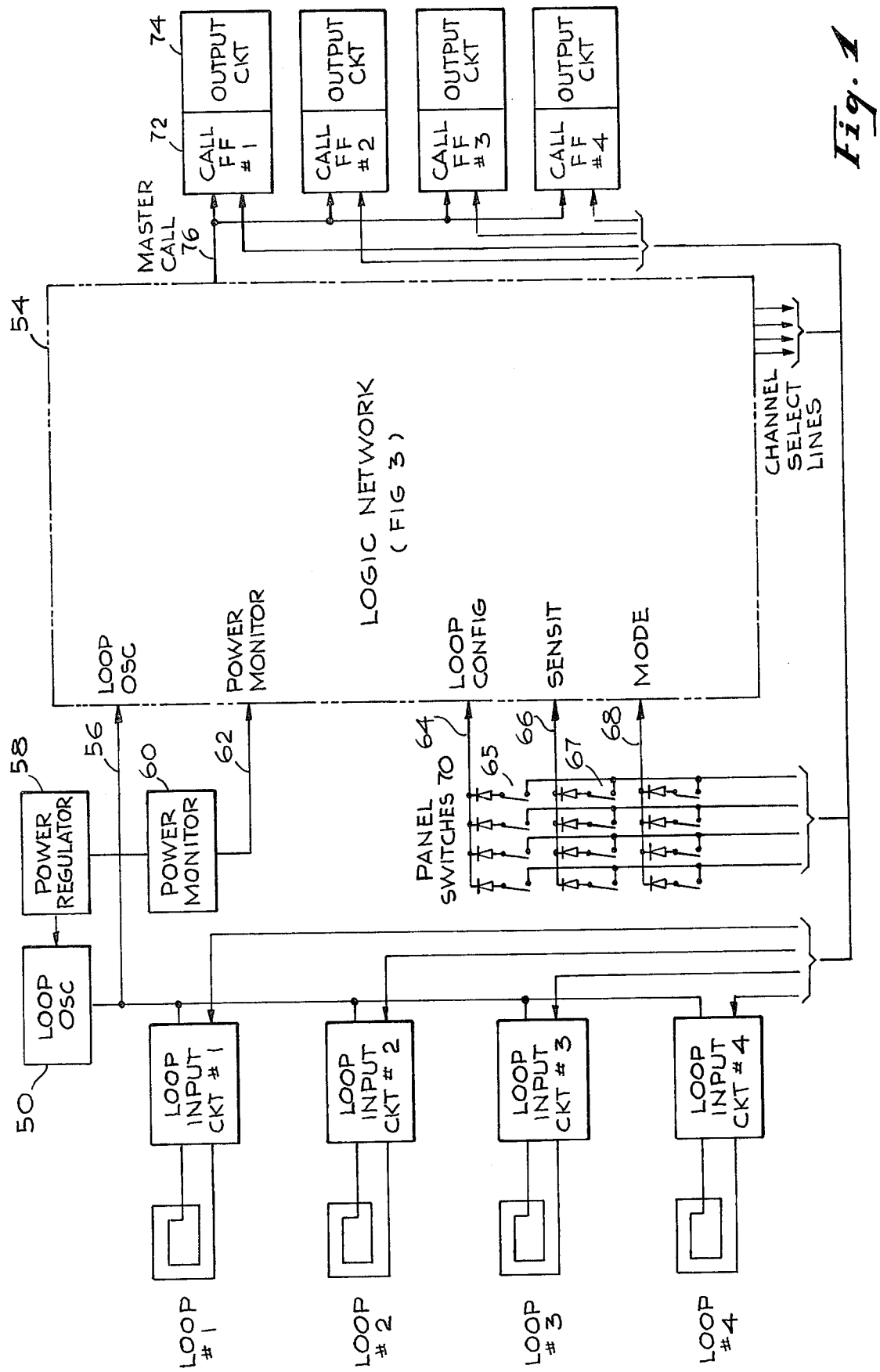
FIG. 1 is a block diagram of a multiple channel inductive loop detection system in accordance with the present invention.

Attention is now called to FIG. 1 which illustrates a block diagram of a system in accordance with the present invention for monitoring the frequency of oscillation of a plurality of inductive loops. In the primary applications of a system in accordance with the present invention, each inductive loop is formed by multiple turns (e.g. 3) of electrically conductive wire buried beneath, and substantially parallel to, the surface of a roadway. Typically, a slot is cut into the roadway surface in a rectangular pattern, approximately 6 × 6, and the wire is then inserted therein prior to closing the slot with an epoxy sealing compound. However, as is well known in the art, loops of various sizes and configurations can be employed for vehicle detection applications.

In an exemplary traffic control application, an inductive loop would be buried beneath the roadway surface in a left turn lane for the purpose of recognizing the presence or passage of a vehicle. Any large metal mass, such as a vehicle, entering the area over the loop will change its inductance. Therefore, as is well known in the art, by monitoring the loop inductance, either directly or indirectly, the presence of the metal mass can be detected.

In order to most easily detect changes in loop inductance, each loop is normally connected to oscillator circuitry usually housed in a cabinet at the side of the roadway. As is also well known in the art, the oscillator circuitry and the loop form an oscillator which oscillates at a frequency dependent upon the inductance of the loop. The circuit values are typically selected so that the center frequency is 30 KHz, for example. The frequency deviation caused by a vehicle over the loop depends on the characteristics of the vehicle. A typical passenger car might vary the oscillator frequency by 2%. A small street-approved motorcycle might vary the loop frequency by only .05%. By appropriately monitoring the frequency of the loop oscillator signal, frequency changes can be recognized and interpreted as a vehicle to be detected.

In accordance with the present invention, as represented in FIG. 1, a common loop oscillator circuit 50 is provided which can be selectively connected, on a time shared basis, to each of a plurality of loop input channels. Each loop input channel includes a loop input circuit 51 which can be enabled by a particular channel select line 52 to couple one or more roadway loops connected thereto to the loop oscillator 50. As will be seen hereinafter, the channel select lines 52 are enabled in sequence by a logic network 54. Thus, within a single scan cycle defined by the logic network, the loop input channels 1, 2, 3, 4 will be connected in sequence to the common loop oscillator circuit 50.

As will be discussed in detail hereinafter, each scan cycle defined by the logic network 54 is comprised of four loop phases, each phase associated with a different one of the loop input channels. During each loop phase, the loop oscillator circuitry 50 will oscillate at a frequency dependent upon the inductance of the loop connected thereto during the particular phase. As previously mentioned, the loop inductance is in turn dependent upon whether or not a vehicle is present on the area of the roadway over the connected loop. The output of the loop oscillator circuitry 50, which will be assumed herein to constitute a square wave, is coupled to input terminal 56 of the logic network 54.

Regulated power for driving the loop oscillator circuitry 50 from a 110 volt 60 cycle source is provided by regulator means 58. In accordance with one aspect of the present invention, a power monitor circuit 60 is provided to monitor the power supplied to the loop oscillator circuitry and other system components. In the event of a power interruption, the power monitor circuitry 60 detects the interruption and functions to initialize the system in a manner to be discussed hereinafter. The output of the power monitor circuitry 60 is connected to input terminal 62 of the logic network 54.

In addition to the input information provided by the loop oscillator circuitry 50 on input terminal 56 and the power monitor circuitry on input terminals 62, the logic network 54 receives further input information on input terminals 64, 66, and 68. The information supplied to input terminals 64, 66, and 68 depends upon the user selectable position of certain two position panel switches 70. The panel switches 70, whose function will be discussed in greater detail hereinafter, include three separate switches for each of the four loop channels. A first set of four switches 65, which controls the logic level applied to the input terminal 64, enables a user to select one of two different system sensitivities dependent upon the physical configuration of the roadway loop connected to the particular channel. That is, for a single small loop, a certain system sensitivity is adequate while a greater sensitivity may be desirable for a large loop or multiple loops connected to a single loop input channel. As will be seen hereinafter, the position of each switch 65 establishes a window threshold value TLQ which is used by the logic network 54 to essentially establish a window within which the loop oscillator frequency can change without producing a call.

The second set of four switches 67 controls the logic level applied to the logic network input terminal 66 to also control the system sensitivity. Each switch 67 may be switched by a user depending upon whether or not it is desirable to detect bicycles and small motorcycles. More particularly, a high sensitivity setting is used where detection of small motorcycles is required and a normal sensitivity setting is used to eliminate bicycle and small motorcycle detections and to desensitize the system to avoid unusual environmental noise conditions such as underground trains, locally buried high current wires, etc. As will be seen hereinafter, the position of each switch 67 determines whether 1,024 or 512 loop cycles are counted during each period measurement portion.

The third set of four panel switches 69 enables the user to select either a PRESENCE or PULSE mode of operation. As will be seen hereinafter, if the PULSE mode is defined, the system will provide a short duration output pulse for each new vehicle arriving over a loop regardless of the length of time the vehicle remains over the loop. In the PRESENCE mode, the system will provide an output signal whose duration corresponds to the length of time the vehicle remains over the loop.

As represented in FIG. 1, the system in accordance with the invention includes an output channel corresponding to each of the loop input channels. As shown, each output channel includes a call flip flop 72 and an output circuit 74 which can, for example, comprise a relay and driver. It has been mentioned that the logic network 54 defines different loop phases by successively enabling the four channel select lines 52. Logic network 54 also has an output terminal 76 which is connected in common to all of the output channel call flip flops 72. As will be seen hereinafter, the logic network 54 operates to provide an enabling signal on output terminal 76 when it recognizes a frequency change associated with a loop input channel indicative of a vehicle present over a loop connected thereto. The channel select lines 52 steer the call signal supplied by the logic network 54 to output terminal 76 to the appropriate output channel call flip flop 72.

Figure 2:
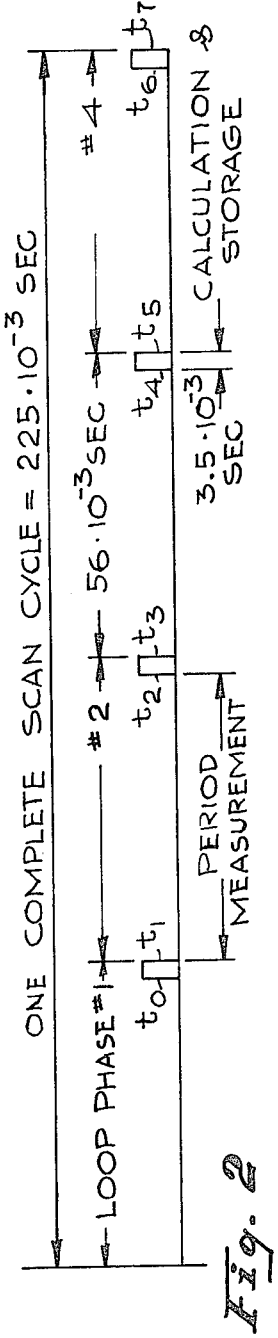
FIG. 2 is a timing diagram illustrating the multiple loop phases within each scan cycle.

Attention is now called to the system timing diagram of FIG. 2 which illustrates one complete scan cycle defined by the logic network 54 and the four loop phases defined during each scan cycle. During each loop phase, a different loop input channel and output channel are operatively connected to the loop oscillator circuitry 50 and logic network 54. Additionally, during each loop phase a different set of three panel switches is active.

Each loop phase consists of two major portions; namely, a period measurement portion which consumes about 15/16 of the entire loop phase time and a calculation and storage portion which consumes about 1/16 of the loop phase time.

Briefly, during the period measurement portion of each loop phase, the frequency of the loop connected to the oscillator circuitry 50 during that phase is monitored by measuring the duration or period of a fixed number of loop oscillator cycles. During the calculation and storage portion of the same loop phase, the measured period is compared with an historical reference period developed during one or more prior scan cycles to determine whether the frequency of the loop has changed sufficiently to indicate that a vehicle has entered or exited the area over the loop. Thus, during the calculation and storage portion, a decision is made whether to produce or cancel or call, and whether to modify the stored historical reference.

Figure 3:
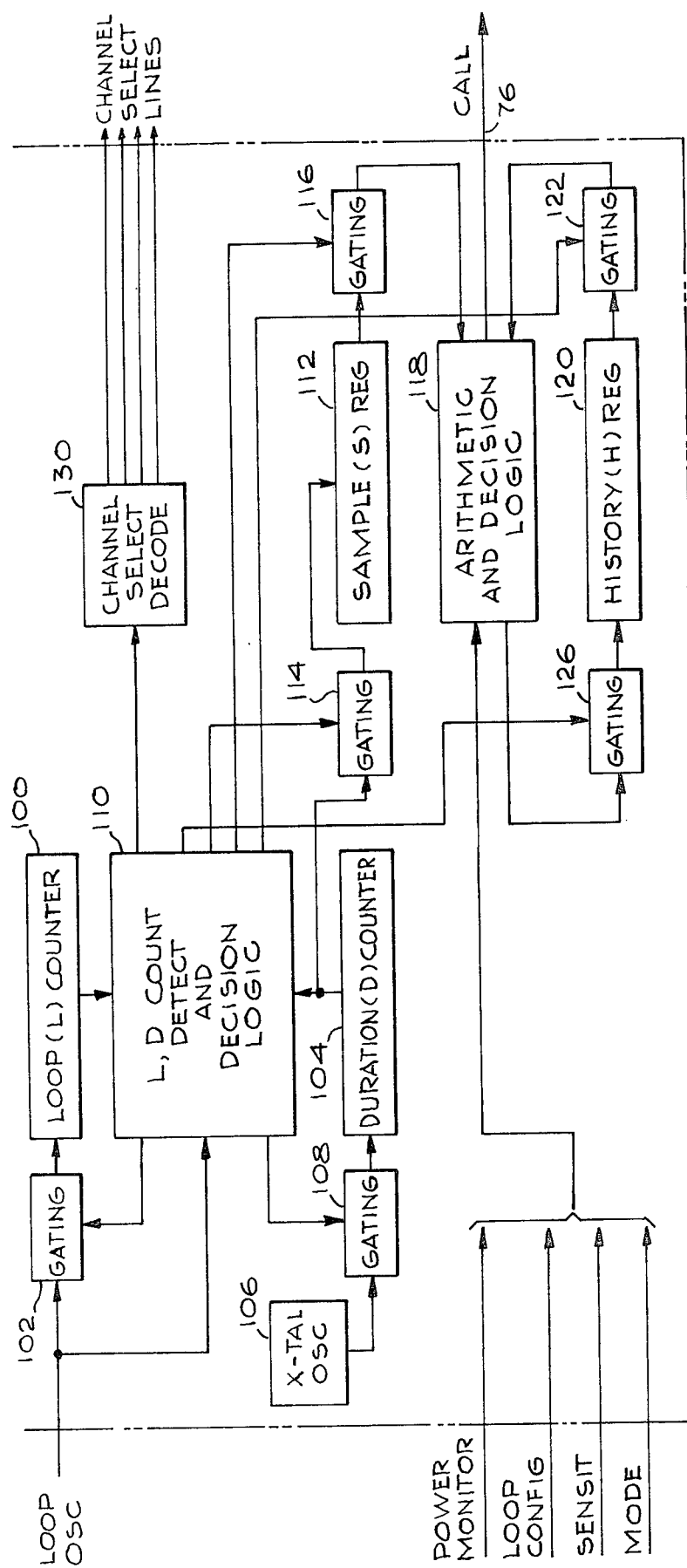
FIG. 3 is a block diagram of the logic network of FIG. 1.

Attention is now called to FIG. 3 which illustrates a block diagram of the logic network 54 of FIG. 1. Initially, the logic network 54 includes a loop (L) counter 100 which counts cycles of the loop oscillator signal applied thereto via gating means 102. The period or duration required to count a predetermined number of loop oscillator cycles is determined by a duration (D) counter 104 which counts cycles defined by a stable crystal oscillator 106. The output of crystal oscillator 106 is applied to the duration counter 104 via gating 108.

In order to detect small changes in loop oscillator frequency, the crystal oscillator 106 should oscillate at a frequency much higher than the frequency of the loop oscillator 50. For a typical application, the parameters are selected so that the loop oscillator 50 will normally oscillate at a frequency between approximately 9 and 40 KHz as represented in line (b) of FIG. 4. The loop oscillator frequency will, of course, depend upon the inductance of the loop connected thereto. The crystal oscillator output signal, as represented in line (a) of FIG. 4, oscillates at a frequency much greater than that of the loop oscillator output signal. The crystal oscillator, for example, is selected to oscillate at 2.33 MHz.

In order to detect small variations in the loop oscillator frequency, it is, of course, important that the L and D counters start counting at precisely the same time. In order to synchronize the initiation of counting in both the L and D counters, a count detect and decision logic means 110 is provided. With the L counter 100 and D counter 104 defining respective start counts, the logic means 110 will respond to a transition in the loop oscillator signal to initiate counting in both the L and D counters. The logic means 110 will thereafter respond to the L counter 100 reaching a predetermined count to terminate counting in the D counter, effected by disabling gating 108. The count then held in the D counter 104 is indicative of the frequency of the loop oscillator.

Concurrent counting by both the L and D counters to measure the period of a fixed number of loop oscillator cycles, as aforedescribed, transpires during the period measurement portion of a loop phase. After the period measurement portion has been completed, the counter in the D counter is transferred to a sample (S) register 112 via gating 114. During the succeeding calculation and storage portion, the sample in register 112 is applied through gating 116 to an arithmetic and decision logic means 118. The arithmetic and decision logic means 118 compares the sample from register 112 with an historical reference supplied from H register 120 via gating 122. Broadly, the arithmetic and decision logic means 118 compared the sample and historical reference to determine whether a change in loop oscillator frequency is of sufficient magnitude and appropriate direction to indicate the presence of a vehicle over the loop. If the decision is affirmative, the logic means 118 supplies an appropriate signal on output line 76. Additionally, logic means 118 loads an historical reference, either the same as or different from the most recent historical reference, back into the H register 120 via gating 126.

The D counter 104 in addition to counting cycles of the crystal oscillator 106 to measure the duration of a fixed number of loop oscillator cycles, functions to control the timing of various operations performed input terminal 154 which, however, is not utilized in accordance with the preferred embodiment of the invention. Ratherr, as will be seen hereinafter, the D counter counts cyclically and is never reset. The D counter counts in response to the pulses applied to its count input terminal 156.

With 11 stages in the L counter, it is apparent that the L counter can define 2,048 different counts; however, in accordance with the present invention, only 1,024 of these counts are utilized. Upon initiation of each period measurement portion of a loop phase, all stages of the L counter are reset to 0. Then the L counter counts 1,024 counts which will be represented by stage L10 switching true. The D counter will count clock pulses provided by the crystal oscillator 106 during the period of the L counter is accumulating the 1,024 counts.

With 19 stages in the D counter, the D counter is able to define a total of 524,288 counts. One-fourth of this total number of counts is dedicated to each loop phase. Thus, each loop phase is defined by the interval required for the D counter to count through 131,072 counts. As was previously pointed out, 1/16 of the counts in each loop phase are used for the calculation and storage portion with the remainder of the loop phase being available for the period measurement portion.

To aid in understanding the function of the D counter in controlling system operation, Table I identifies the D counter bit configuration at several times with respect to the system timing diagram of FIG. 2.

TABLE I

|   | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|
| $t_0$ | 0 | 0 | 0 | 0 | 0 | 0 | 0 | 0 | 0 | 0 | 0 | 0 | 0 | 0 | 0 | 0 | 0 | 0 | 0 |
| $t_1$ | 0 | 0 | 0 | 0 | 0 | 1 | 0 | 0 | 0 | 0 | 0 | 0 | 0 | 0 | 0 | 0 | 0 | 0 | 0 |
| $t_2$ | 0 | 1 | 0 | 0 | 0 | 0 | 0 | 0 | 0 | 0 | 0 | 0 | 0 | 0 | 0 | 0 | 0 | 0 | 0 |
| $t_3$ | 0 | 1 | 0 | 0 | 0 | 1 | 0 | 0 | 0 | 0 | 0 | 0 | 0 | 0 | 0 | 0 | 0 | 0 | 0 |
| $t_4$ | 1 | 0 | 0 | 0 | 0 | 0 | 0 | 0 | 0 | 0 | 0 | 0 | 0 | 0 | 0 | 0 | 0 | 0 | 0 |
| $t_5$ | 1 | 0 | 0 | 0 | 0 | 1 | 0 | 0 | 0 | 0 | 0 | 0 | 0 | 0 | 0 | 0 | 0 | 0 | 0 |
| $t_6$ | 1 | 1 | 0 | 0 | 0 | 0 | 0 | 0 | 0 | 0 | 0 | 0 | 0 | 0 | 0 | 0 | 0 | 0 | 0 |
| $t_7$ | 1 | 1 | 0 | 0 | 0 | 1 | 0 | 0 | 0 | 0 | 0 | 0 | 0 | 0 | 0 | 0 | 0 | 0 | 0 | during the calculation and storage portion. This will be discussed in significantly greater detail in connection with FIG. 5. Suffice it to say at this point, however, one complete cycle of the D counter defines the duration of the previously mentioned scan cycle. The two most significant stages of the D counter are used to define the four different loop phases within each scan cycle. This is, the four different states defined by the two most significant stages of the D counter 104 are decoded by the channel select decode means 130 for successively enabling the channel select lines 52 previously mentioned in the description of FIG. 1.

Figure 5:
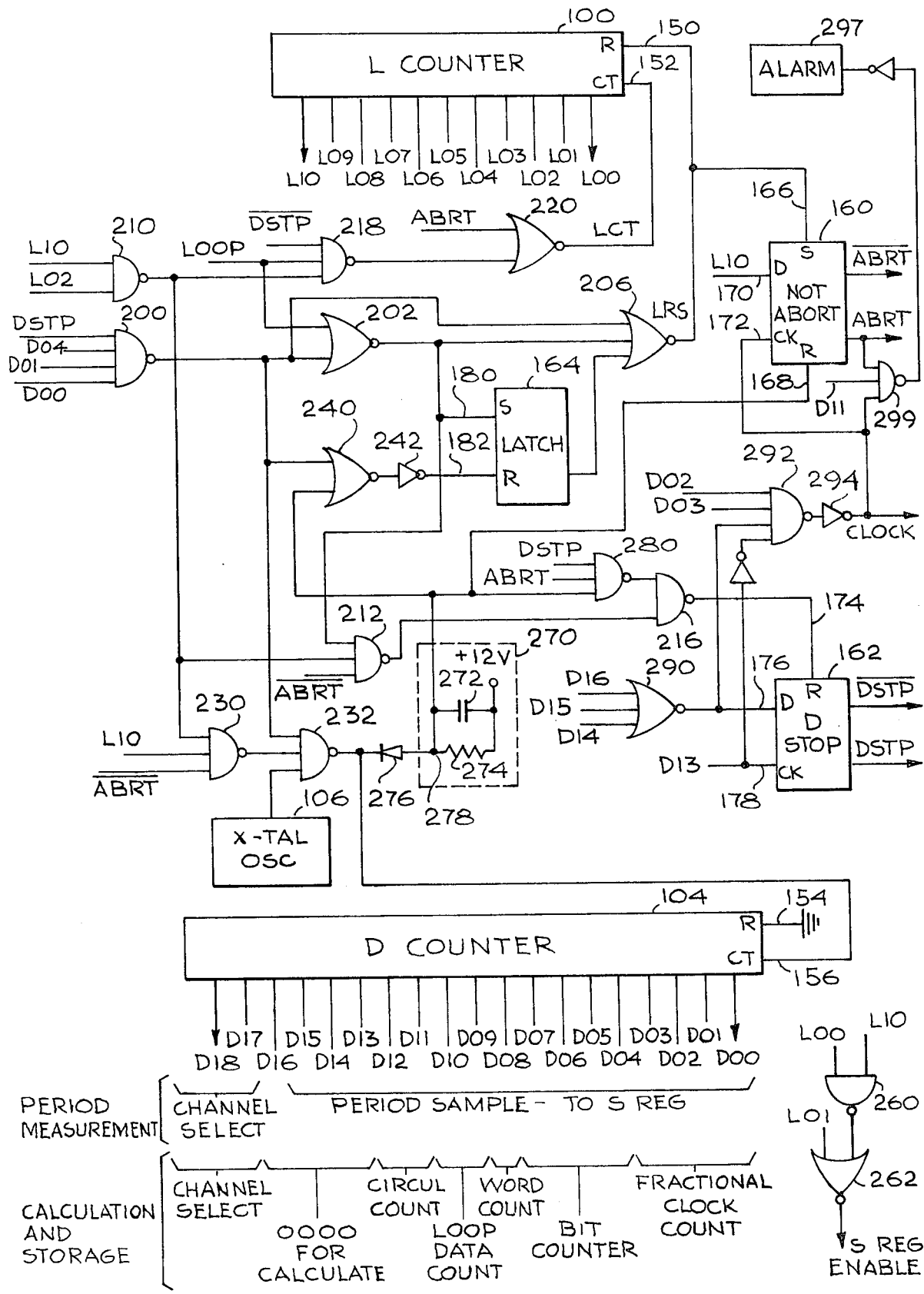
FIG. 5 is a logic diagram primarily illustrating the period measurement logic encompassing the loop (L) counter, the duration (D) counter and the count detect and decision logic of FIG. 2.

Attention is now called to FIG. 5 which illustrates, in greater detail than was shown in FIG. 3, the L counter 100, the D counter 104, the gating 102, the gating 108, and the count detect and decision logic 110.

The L counter 100 preferably comprises an 11-stage (L00–L10) binary ripple counter. The L counter includes a reset input terminal 150 and a count input terminal 152. Whenever a pulse is applied to the reset input terminal 150, all stages of the L counter are reset to 0. Whenever a pulse is applied to the count input temrinal 152, the binary count defined by the L counter stages is incremented by one.

The D counter 104 comprises a 19-stage (D00–D18) binary ripple counter. The D counter also has a reset From the foregoing Table I, it can be seen that each calculation and storage portion starts when D counter stages D00–D16 are all 0. Each calculation and storage portion ends when stage D13 switches true. It should be recognized that whenever stages D00–D16 all switch false, a carry will have been propagated to stages D17 and D18. That is, the count defined by stages D17 and D18 will change at times $t_0$, $t_2$, $t_4$, and $t_6$. Since the channel select decode means 130 (FIG. 3) is responsive to the count in stages D17 and D18, the loop oscillator 50 (FIG. 1) will be switched to a different loop at times $t_0$, $t_2$, $t_4$, and $t_6$. Thus, during the period measurement portion of each loop phase 1, the frequency of loop 1 may be measured. At time $t_0$, the loop oscillator 50 is switched to loop 2 and the calculation and storage portion begins with respect to the period measured with respect to loop 1. During loop phase 2, the frequency of loop 2 is measured, etc.

From the foregoing Table I it will further be apparent that during each calculate and storage portion (e.g., between $t_0$ and $t_1$), the D counter will count through 8,192 (i.e., $2^{13}$) states. As will be seen hereinafter, a clock signal for use during the calculation and storage portion is developed from D counter stage D03 meaning therefore that 512 (i.e., $2^9$) clock periods are available during each calculate and storage portion.

In accordance with a preferred embodiment of the invention, as represented in FIG. 5, the gating logic is implemented with NAND and NOR type gates. As is well known in the art, a NOR gate will provide a false (0) output at all times except when all of its inputs are false (0). On the other hand, the NAND gate will at all times provide a true (1) output except when all of its inputs are true (1) and in this event, will provide a false (0) output. When referring to FIG. 6 hereinafter for the purpose of explaining the operation of the circuitry of FIG. 5, a true (1) state will be represented by a high level signal and a false (0) state will be represented by a low level signal.

Prior to considering in detail the gating in FIG. 5, note should be taken of three flip flops used therein; namely, the NOT ABORT flip flop 160, the D-STOP flip flop 162 and the LATCH flip flop 164. The flip flops 160 and 162 have both clocked and unclocked inputs. More particularly, a high level signal applied to the set input terminal 166 will immediately set the flip flop 160 regardless of clocking. Similarly, a high level signal applied to the reset input terminal 168 will immediately reset the flip flop 160. However, a high level signal applied to the input terminal 170 will have no effect until a clock pulse is applied to clock input 172.

Similarly, flip flop 162 can be immediately reset in response to a high level signal applied to input 174. Flip flop 162 does not have an unclocked set input. Flip flop 162 is set when a high level signal is applied to clocked input 176 concurrent with a clock pulse applied to clock input 178. As will be discussed hereinafter, this occurs at the end of each calculation and storage portion ($t_1$, $t_3$, $t_5$, $t_7$) when D counter stage D13 is switched true.

On the other hand, the LATCH flip flop 164 is set in response to a high level signal applied to set input terminal 180 and reset in response to a high level signal applied to reset input terminal 182.

It has previously been mentioned that in accordance with the preferred embodiment of the invention, the D counter 104 cyclically counts cycles of the crystal oscillator 106 and is never reset. However, as will be seen hereinafter, the D counter is stopped at two points within each loop phase by disabling the gate coupling the crystal oscillator output to the D counter count input terminal 156. First, at the beginning of each period measurement portion, the D counter is caused to wait at a particular D count until a loop oscillator signal negative-going edge is detected, at which time the gate coupling the crystal oscillator to the D counter is enabled to permit the D counter to start counting. Second, when the L counter reaches the final (1,024) count in a period, the D counter is stopped until the count therein has been transferred to the S register 112 (FIG. 3). By stopping the D counter at this point, carries which still may be rippling through the D counter at the end of a period measurement, are permitted to settle so that a true count can be transferred to the S register.

The operation of the gating shown in FIG. 5 will now be described in connection with the waveform diagram of FIG. 6. Assume, as a starting condition, that a calculation and storage portion of a prior loop phase has just been completed (D13 has just gone true) and that the flip flop 162 has been set to cause the logic signal DSTP to be true as shown in line (b) of FIG. 6. Also assume that the NOT ABORT flip flop 160 is set.

At the start of a period measurement portion, i.e., after stage D13 switches true, the D counter will continue to count until stages D00, D01, and D04 all become true. When this occurs, the output of gate 200, as shown in line (c) of FIG. 6, will go false thereby disabling gate 232 and stopping the D counter. As long as the loop signal (line a) is true, the output of gate 202 (line d) will be false. However, as soon as the loop signal next goes false at time 204 in FIG. 6, the LATCH flip flop 164 will be set. Then, during the succeeding time that the loop signal is true, all of the inputs to NOR gate 206 will be false, thereby producing a true output signal LRS which is applied to the reset input terminal 150 of the L counter. This action resets all stages of the L counter including stages L02 and L10 as represented in lines (g) and (h) of FIG. 6. The output of NOR gate 206 additionally sets the NOT ABORT flip flop 160 if it had not previously been set, as has been assumed thus far.

When stages L02 an L10 switch false, the output of gate 210 (line i) switches true. When the loop signal next becomes false at time 214 as shown in line (a), the output of NOR gate 202 will again go true to force the output of NAND gate 212 false. This action in turn will produce a true output from NAND gate 216 to reset the D-STOP flip flop 162. The action of gates 212 and 216 is represented respectively in lines (j) and (k) of FIG. 6.

With the flip flop 162 reset so that the signal $\overline{DSTP}$ is true, the output of NAND gate 218, as represented in line (l), can now follow the loop signal, (line a) inverted. The output of gate 218 is applied to NOR gate 220 which in turn provides a signal identical to the loop signal (line a) to the count input terminal 152 of counter 100. The output of gate 220 is illustrated in line (m) of FIG. 6.

When the loop signal went false at time 214 (line a), it will be recalled that the D-STOP flip flop 162 was reset via gate 202 going true, gate 212 going false, and gate 216 going true. As soon as the signal DSTP went false, the output of gate 200 went true. Since the output of NAND gate 230 was also true, NAND gate 232 was now able to pass the pulses provided by the crystal oscillator 106 to the count input terminal 156 of the D counter 104. Thus, by way of summary, the D counter starts to count pulses supplied by the crystal oscillator 106 in response to a particular edge 214 of the loop signal as represented in line (a). The L counter 100 starts counting on the immediately succeeding negative-going edge 236 of the loop signal.

It should of course be appreciated that it is essential to synchronize the starting of the D counter with a particular point on the loop signal since, as will be recalled from FIG. 4, the frequency of the crystal oscillator signal is so much greater than that of the loop signal and since the primary purpose of the apparatus herein is to measure changes in the loop oscillator signal frequency.

It should also be pointed out that when the flip flop 162 was reset to switch the output of gate 200 true, this produced a false output from NOR gate 240. The output of gate 240 was, however, inverted by inverter 242 and supplied to the reset input terminal of the LATCH flip flop 164. LATCH flip flop 164 remains reset until the start of the next period measurement portion when it again participates in the generation of an LRS pulse (line f of FIG. 6).

It should now be appreciated that after the edge 236 of the loop signal, the L counter 100 and D counter 104 will continue to count. Counting of the L counter is represented in lines (n) and (o) of FIG. 6.

After 1,024 counts have been counted by the L counter, as indicated by stage L10 switching true, the D counter will be stopped via the action of NAND gates 230 and 232. That is, when stage L10 of the L counter goes true at time 250 (line p, FIG. 6) the output of gate 230, which was previously true, goes false. This action disables NAND gate 232 and prevents it from passing further pulses from the crystal oscillator 106 to the D counter input terminal 156. The L counter is permitted to continue to count through a few more cycles to permit the D counter to settle and then to cause the contents of the D counter to be transferred to the S register for processing during the calculation and storage portion. More particularly, it will be recognized that as soon as stage L10 switches true, all of the other stages of the L counter will be false. Thus, the output of gate 260 represented in line (q) of FIG. 6 will initially be true after stage L10 becomes true. However, during the next cycle of the loop oscillator, stages L00 will go true thereby producing a false output from NAND gate 260. This in turn will produce a true output from NOR gate 262 (line r, FIG. 6) to thereby cause the contents of the D counter to be transferred, in parallel, to the S register. When stage L02 thereafter goes true, the output of previously mentioned NAND gate 210 will then go false thereby disabling the NAND gate 218 and preventing further count inputs to the L counter. This then will leave the L counter in a state in which stages L10 and L02 are true. It will be recalled that this is the condition previously assumed at the start of the period measurement portion.

In the discussion of FIG. 5 thus far, it has been assumed that the NOT ABORT flip flop 160 remains set. The NOT ABORT flip flop and associated circuitry is provided to assure continued operation of the system even in the event of certain types of failures. For example, from the explanation thus far, it should be appreciated that the system depends upon the continuance of the loop signal (line a, FIG. 6) in order to start the D counter, transfer the contents of the D counter to the S register, etc. If, for example, one of the loops in the roadway becomes damaged and open circuited, when that loop is connected to the oscillator circuitry 50, it may fail to oscillate. Means are provided, as illustrated in FIG. 5, for insuring that the system continues to operate with respect to the other loop input channels. More particularly, there are three general circumstances in which the NOT ABORT flip flop 160 and associated circuitry of FIG. 5 comes into play:

1. At the start of a period measurement portion, if the loop oscillator fails to oscillate, it is nevertheless important that the D counter resume counting. In order to assure this, a substitute is required for the loop signal and this is initiated by the RC network 270 in a manner to be described hereinafter;

2. At the end of a period measurement portion, if the loop oscillator signal stops prior to transferring the contents of the D counter to the S register, it is again necessary to generate some substitute for the loop signal. The RC network 270 initiates the operation in a manner to be described hereinafter;

3. The third condition in which the NOT ABORT flip flop 160 is used is in the event the L counter fails to overflow, i.e., L10 fails to become true, within the interval allotted for period measurement. In this situation, the NOT ABORT flip flop 160 is reset to indicate a faulty period measurement.

Further, as will be seen hereinafter, whenever the NOT ABORT flip flop 160 is reset during a loop phase, it means that the period measurement made during that phase is faulty and that the data in the S register should not be utilized during the calculation and storage portion as correct data. If the flip flop 160 remains reset throughout the calculation and storage portion, an alarm device 297 is activated by gate 299 (FIG. 5).

The RC network 270 is comprised of a capacitor 272 and a resistor 274 connected in parallel. A source of positive potential (e.g. +12 volts) is connected to one terminal of the resistor and capacitor and the opposite terminal is connected through a diode 276 to the count input terminal 156 of the D counter. In the normal operation of the system in which abort conditions do not occur and the NOT ABORT flip flop 160 remains set, the waveform produced at the output of NAND gate 232 will charge the capacitor 272 and the potential at the junction 278 will remain a diode drop above ground, e.g., 0.7 volts. Line (a) of FIG. 7 represents the period of normal operation of the gate 232 which couples the output of crystal oscillator 106 to the D counter 104. Assume now some circumstance which prevents the D counter 104 from counting for a longer than usual interval. This causes the potential on the junction 278 to increase as shown in line (b) of FIG. 7. The junction 278 is connected to the reset input terminal 168 of the NOT ABORT flip flop 160. As the potentials on the junction 278 increases, at a certain point it will reset the NOT ABORT flip flop 160 to develop the ABRT logic signal shown in line (c) of FIG. 7. If the foregoing actions occur at the end of a period measurement portion, this will cause the output of gate 230 to go true as represented in line (d) of FIG. 7. If the D-STOP flip flop 162 is true, which it is at the beginning of a period measurement portion, it will be reset via NAND gate 280 and NAND gate 216. Also, if the LATCH flip flop 164 is set, it too will be reset via gates 200 and 240 and inverter 242. The outputs of gates 280 and 216 are shown in lines (e) and (f) of FIG. 7. With the D-STOP flip flop 162 reset, the gate 232 coupling the crystal oscillator 106 to the D counter 104 will again pass count pulses to the D counter. Thus, the incorporation of the RC network 270 essentially provides an escape path to assure that the planned stops of the D counter remain temporary, even though some condition occurs which prevents the loop oscillator circuitry 50 from providing the pulses necessary to advance sequential control logic through these stops.

It was previously mentioned that if for some reason the L counter fails to overflow (i.e., L10 does not become true) within the interval allotted for period measurement, then it is desired to reset the NOT ABORT flip flop 160 in order to indicate to the calculation and storage processing circuitry that the particular measurement is not valid. This operation is achieved by steering a clock pulse developed at the beginning of the calculation and storage portion to clock input terminal 172 of flip flop 160. This causes the flip flop 160 to assume the state of stage L10 which is connected to the data input terminal 170. That is if stage L10 is true meaning that the L counter had counted to 1,024 during the period measurement portion, then flip flop 160 remains set. If L10 is false, then flip flop 160 is reset.

The clock pulse supplied to clock input terminal 172 of flip flop 160 is developed via gates 290 and 292. During each calculation and storage portion, D counter stages D13, D14, D15, and D16 are all false thus producing a true signal at the output of gate 290 and at the output of inverter 291. Consequently, the output of gate 292 will follow the D counter stages D02 and D03. That is, the output of gate 292 will be false whenever D02 and D03 are both true during the calculation and storage portion (i.e., D13–D16 all false). The output of gate 292 is inverted by inverter 294 to develop clock pulses used to time operations during the calculation and storage portion. The first of these clock pulses, applied to clock input terminal 172 of flip flop 160, controls the NOT ABORT flip flop as described. It is pointed out that when stage D13 goes true, the D-STOP flip flop 162 is set; this terminates the calculation and storage interval and initiates a new period measurement portion.

Figure 8:
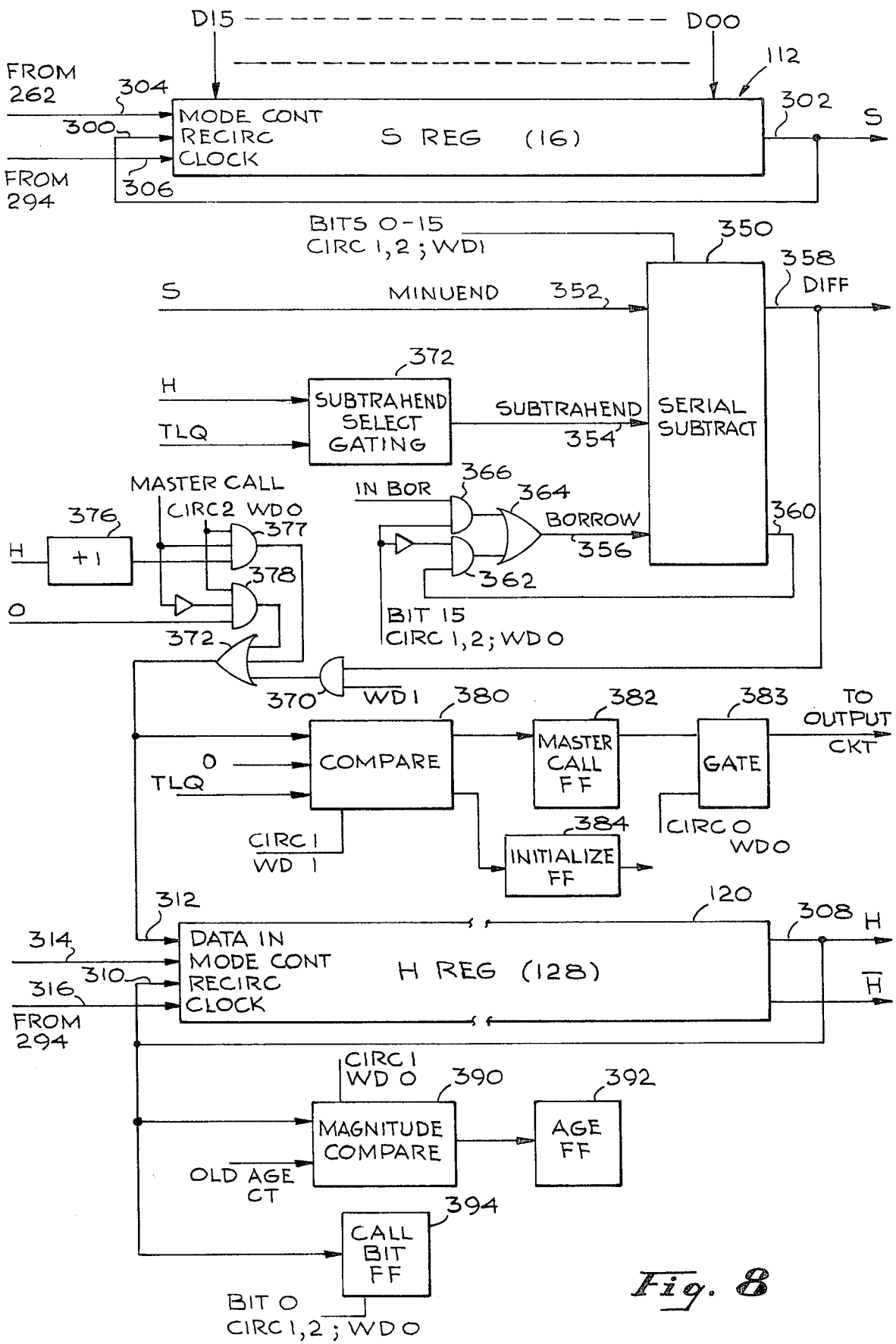
FIG. 8 is a logic diagram primarily illustrating the logic circuitry operable during the calculation and storage portion of a loop phase and illustrating principally the sampel (S) register, the history (H) register and the arithmetic and decision logic of FIG. 2.

Attention is now directed to FIG. 8 which illustrates the S register 112 and the H register 120 in greater detail than was shown in FIG. 3. Additionally, FIG. 8 illustrates the arithmetic and decision logic 118 of FIG. 3 in much greater detail.

The S register is comprised of 16 binary stages and is capable of being (1) parallel loaded and (2) serially shifted to provide a serial output. More particularly, the S register 112 is provided with 16 parallel input terminals which are derived from stages D00–D15 of the D counter 104 of FIG. 5. In addition, the S register 112 includes a serial input terminal 300 which is connected to the S register serial output terminal 302. The S register further includes a mode control terminal 304 and clock input terminal 306. When a true signal from gate 262 of FIG. 5 is applied to the control terminal 304, the information available on the 16 parallel input lines is loaded into the S register 112. When a clock pulse is applied to the terminal 306 from inverter 294 of FIG. 5, the contents of the register 16 are right-shifted and the output bit available on output terminal 302 is recirculated via input terminal 300.

The H register 120 is comprised of 128 binary stages connected as a shift register. The H register 120 is provided with a serial output terminal 308 which is coupled back to a recirculate input terminal 310. In addition, the H register 120 has a serial data input terminal 312. When a true signal is applied to the mode control terminal 314, the H register accepts serial data available on input terminal 312 in synchronism with clock pulses applied to the clock input terminal 316 from inverter 294 (FIG. 5). When the signal applied to the mode control terminal 314 is false, the data in the H register 120 is recirculated in synchronism with the clock pulses.

Prior to considering the arithmetic and decision logic of FIG. 8, attention is directed to FIG. 9 which illustrates the 128 bit format of the H register 120. The 128 bits consist of four fields, each containing 32 bits of data with respect to a different loop channel. Each 32-bit field consists of two 16-bit words, i.e. word 0 and word 1. Bit 0 of each word 0 constitutes a call bit and if true, indicates an existing call on that loop channel. Bits 1–15 of each word 0 represent the age of the call. This will be explained in greater detail hereinafter but suffice it to say at this time, that when a call is produced with respect to a particular loop channel, a 1 is inserted into bit 0 of word 0 of the H register field corresponding to that loop channel. As long as the call condition persists, the count in bit positions 1–15 of word 0 is incremented during each succeeding scan cycle. In this manner, the age of a call can be determined. As will be seen hereinafter, the age information is utilized to initiate a WASH process which over a relatively long time interval, cancles the call.

Word 1 of each H register field is used to store a number which will be referred to as the historical reference or historical reference duration. As will be seen hereinafter, during a calculation and storage portion, the historical reference is compared with a sample in the S register and based on the comparison, a determination is made as to whether the historical reference should be modified and if so, the manner in which it should be modified. Also, as a consequence of the comparison between the historical reference and the sample in the S register, a decision is made as to whether to produce a call to indicate the presence of a vehicle over the roadway loop.

It was previously mentioned that the D counter is used during each calculation and storage portion for purposes of control. It will further be recalled from Table I that the beginning of each calculation and storage portion is defined by D counter stages D13–D16 all being reset. Each calculation and storage portion terminates when stage D13 is subsequently set. During each interval when stages D13–D16 are all 0, the D counter will step through 8,192 (i.e., $2^{13}$) unique states. Many of these states are used to define times at which particular arithmetic and decision operations take place. As was previously mentioned in the description of FIG. 5, inverter 294 provides clock pulses coincident with the switching of stage D03. Utilization of stage D03 to provide clock pulses, leaves the nine stages D04–D12 available to define 512 unique operating states during each calculation and storage portion.

In order to better understand the manner in which the D counter 104 is utilized for control purposes during the calculation and storage portion, attention is again directed to FIG. 5 which illustrates the bit utilization of the D counter stages. Stages D17 and D18 are utilized for purposes of channel selection both during the period measurement and the calculation and storage portions. That is, the bit configuration of stages D17 and D18 operates via the channel select decode means 130 of FIG. 3 to establish the particular loop to which the loop oscillator circuitry 50 is connected. Additionally, the output of the channel select decoder means 130 selects the particular set of three panel switches to couple to input terminals 64, 66, 68 (FIG. 1) and also determines the particular output channel to which the information on logic network output terminal 76 is steered.

Stages D13–D16, define the calculation and storage portion when all of these stages are 0.

D counter stages D11 and D12 are used to define the circulation count. That is, during each calculation and storage portion, the H register 120 is circulated four times; each circulation is defined by a different state of stages D11 and D12. As will be seen hereinafter, circulation 0 is used primarily to establish certain start conditions in the arithmetic and decision logic of FIG. 8 and to transfer the stage of a master call flip flop to the selected output channel call flip flop 72. Circulation 1 is used primarily for the purpose of making the decision as to whether the sample in the S register represents a call condition. Circulation 2 is used primarily to modify the contents of the H register if appropriate. Circulation 3 is not used.

Stages D09 and D10 are used to define the loop data count. That is, it will be noted from FIG. 9 that the H register is comprised of four fields, each corresponding to a different loop channel. During each circulation (as defined by a unique state of stages D11 and D12) all four fields of the H register are shifted out. The particular field available at the output of the H register is designated by the states of stages D09 and D10.

It will also be noticed in FIG. 9 that each H register field is comprised of two words. D counter stage D08 identifies the particular word available at the output of the H register. Thus, when stage D08 is 0, word 0 is available at the H register output and when stage D08 is 1, word 1 is available at the H register output.

D counter stages D04–D07 define 16 bit times. That is, each of the 16 states defined by D counter stages D04–D07 indicates the availability of a different bit of the 16-bit word at the H register output.

Thus, it should be appreciated that within each calculation and storage portion, as defined by an all 0 configuration of stages D13–D16, stages D04–D10 will identify the particular bit of the 128 bits in the H register which is available at the H register output. As previously mentioned, the clock pulses developed by inverter 94 of FIG. 5 occur coincident with the switching of D counter stage D03. Stages D00–D02 define fractional portions of a clock period.

Table II set forth hereinafter describes the various operations and decisions occurring during each of the four H register circulations performed during each calculation and storage portion. FIG. 8 illustrates the apparatus for executing the operations and making the decisions set forth in Table II. Table III set forth hereinafter summarizes the operations executed during each calculation and storage portion depending upon which of the following four basic processes are required:

1. INITIALIZE
2. ADAPT
3. WASH
4. NO WASH

It will be recalled that panel switches 69 (FIG. 1) enable the selection of either a PRESENCE or PULSE mode of operation. In initially referring to Tables II and III and FIG. 8, the PRESENCE mode will be assumed. Reference will subsequently be made to Table IV and FIGS. 10 and 11 to explain the PULSE mode.

Prior to considering Table II and FIG. 8 in detail, it would first be helpful to understand the utility of each of the aforementioned basic processes. From what has been said thus far, it should now be apparent that during each calculation and storage portion, the value of a sample, transferred into the S register from the D counter, is compared with an historical reference stored in the H register. The difference between the sample and historical reference is a measure of the inductance change of the associated roadway loop. If the difference is small falling within a certain range (defined by 0 and a threshold number TLQ), then in the absence of an existing call, the historical reference is modified slightly to adapt to the change. If the difference falls to one side of the range (i.e., less than 0) a call signal is generated and if it falls to the other side of the range (i.e., greater than TLQ), a new historical reference is selected. The establishment, maintenance and modification of the historical reference is determined in accordance with various conditions and the aforementioned processes by which the historical reference is operated upon function as follows:

INITIALIZE: The function of this process is to establish a new historical reference in the H register. As will be seen hereinafter, this initial historical reference is equal to the value of the current sample minus the applicable threshold number (TLQ). This process occurs when power is first supplied to the unit and following any interruption of power, as may be recognized by the power monitor 60 (FIG. 1). This process may also occur when the inductance of the corresponding loop changes quickly by a large amount in the non-call direction, as after a vehicle exits from over the area of a loop after initiation of the WASH process.

ADAPT: The function of this process is to accommodate slow drift in the effective inductance of the roadway loops. Such drift may be due to small changes in factors such as moisture and temperature. The drift introduces small and slowly varying count differences between the sample and historical reference, which may be either positive or negative. This process accommodates the drift by slowly varying the historical reference such that the historical reference during one calculation and storage portion ($H_{n+1}$) differs from the historical reference during a prior calculation and storage portion ($H_n$) by one count.

WASH: The function of this process is to gradually wash out a call after it has existed for a long period. As has been mentioned, word 0 of each H register field stores the age of a call. Means are provided in the apparatus of FIG. 8 for determining whether the call is old or young; i.e., whether the age exceeds a certain predetermined threshold age. This wash process operates after a call is recognized as being old, to slowly vary the historical reference, as by changing it by one count during each calculation and storage portion, to ultimately wash out the difference between the current sample and historical reference to thereby terminate the call condition.

NO WASH: The function of this process is to maintain the historical reference during the time that a call is young.

In addition to the previously described S and H registers, the apparatus of FIG. 8 includes arithmetic circuitry including a serial subtraction circuit 350. The subtraction circuit 350 is well known in the art and is illustrated as including a minuend input terminal 352, a subtrahend input terminal 354, and a borrow input terminal 356. In addition, the circuit 350 is provided with a difference output terminal 358 and a borrow output terminal 360. The borrow output terminal 360 is connected back to the borrow input terminal 356 via AND gate 362 and OR gate 364. It has been assumed that the subtraction circuit 350 includes an appropriate one bit time delay to enable a borrow bit to be carried from one bit position to the next. AND gate 366 is provided to enable an initial borrow to be introduced, where required, in order to vary the difference by one. That is, in the absence of an initial borrow being entered, the difference value supplied by the subtraction circuit 350 will be equal to the minuend minus the subtrahend. However, if an initial borrow is entered at the beginning of a subtraction process, then the difference will be equal to the minuend minus (subtrahend +1).

The serial output of the S register available on terminal 302 is applied to the input terminal 352 of subtraction circuit 350 to execute the various operations defined by Table II set forth hereinafter. Subtrahend select gating 372 is provided for selectively steering either the output of the H register or a threshold number Attention is now directed to the following Table II which will be discussed in detail with reference to the apparatus of FIG. 8.

TABLE II (PRESENCE MODE)

| | D12 | D11 D10 | D09 D08 | | OPERATION |
|---|---|---|---|---|---|
| Circ 0, Wd 0 | 0 | 0 0 | 0 1 | 0 | Establish Start Conditions; Reset (1) CALL BIT FF(2) AGE FF(3) INITIALIZE FF; |
| Circ 0, Wd 1 | 0 | 0 0 | 0 1 | 1 | Read and Reset MASTER CALL FF |
| Circ 1, Wd 0 | 0 | 1 0 | 0 1 | 0 | Establish (1) CALL BIT FF, (2) AGE FF, (3) Initial Borrow (IB) |

$$\begin{array}{ccc} \text{CONDITION} & & \text{ACTION} \\ \text{Call Bit} \quad \text{Age} & & \text{Initial Borrow} \\ 0 \quad\quad 0 & & 0 \\ 1 \quad\quad 0 & & 1 \\ 1 \quad\quad 1 & & 0 \end{array}$$

| Circ 1, Wd 1 | 0 | 1 0 | 0 1 | 1 | |
|---|---|---|---|---|---|

OPERATION     DECISION     ACTION
Min   Sub   IB   Diff($H_{INT}$)    (1) $H_{INT} < 0$    Call; Set MASTER CALL FF
(1)   S   $H_n$   0   S-$H_n$    (2) $H_{INT} >$ TLQ    Initialize; Set INITIALIZE FF
(2)   S   $H_n$   1   S-($H_n$+1)    (3) $0 \leq H_{INT} \leq$ TLQ    Adapt

| Circ 2, Wd 0 | 1 | 0 0 | 0 1 | 0 | If Master Call True, Increment Age; Otherwise Reset Age; Establish Initial Borrow |
|---|---|---|---|---|---|

$$\begin{array}{cccc} & \text{CONDITION} & & \text{ACTION} \\ \text{Call Bit} & \text{Mas Call} & \text{Initialize} & \text{Initial Borrow} \\ 1 & X & 0 & 1 \\ 0 & 0 & 0 & 1 \\ X & X & 1 & 0 \\ 0 & 1 & 0 & 0 \end{array}$$

| Circ 2, Wd 1 | 1 | 0 0 | 0 1 | 1 | |
|---|---|---|---|---|---|

CONDITION       OPERATION
Initialize   Initial Borrow    Min   Sub   Diff
(1)   1    0     S   TLQ   S-TLQ
(2)   0    1     S   $H_{INT}$   S-($H_{INT}$+1)
(3)   0    0     S   $H_{INT}$   S-$H_{INT}$

| Circ 3, Wd 0 | 1 | 1 0 | 0 1 | 0 | |
|---|---|---|---|---|---|
| Circ 3, Wd 1 | 1 | 1 0 | 0 1 | 1 | No Action |

TLQ to the subtrahend input terminal 354.

The difference provided by the subtraction circuit 350 on terminal 358 is steered to the data input terminal 312 of H register 120. As will be seen hereinafter, the H register inputs information from the subtraction circuit 350 during the word 1 time of a circulation via gates 370 and 372. During the word 0 time, the H register can accept data on data input terminal 312 via either gate 377 or 378 depending whether the age count is being updated or reset to 0. That is, the age count emerging from the H register during a word 0 time can be steered through the add 1 circuit 376 to provide an updated age for entry back into the H register via gates 377 and 372. Alternatively, a zero age can be entered back into the H register via gates 378 and 372. If the MASTER CALL flip flop (to be discussed hereinafter) is true, then the updated age count will be entered back into the H register. If the MASTER CALL flip flop is false, then an age count of all zeros will be loaded into the H register.

The difference supplied by the subtraction circuit 350 is applied to compare circuitry 380 which compares it with two values, 0 and TLQ, to determine its relative magnitude. The results of the comparison selectively cause the MASTER CALL flip flop 382 and an INITIALIZE flip flop 384 to be set in accordance with certain criteria to be discussed hereinafter in connection with Table II.

Magnitude compare circuitry 390 is provided to examine the age count stored in the H register to determine whether the age count exceeds a predetermined age threshold. If the age count indicates the call is old, then the AGE flip flop 392 is set. If any call exists at all, regardless of whether it is young or old, the CALL BIT flip flop 394 is set.

Table II identifies the operations occurring during a common loop data count (i.e., D10=0, D09=1) for the four successive circulations which take place during each calculation and storage portion. That is, for the exemplary calculation and storage portion to be discussed, the H register data is examined when D10, D09 is 01. During the succeeding calculation and storage portion, the H register data with respect to the next loop channel will be processed, that is, during each of the four circulations when D10, D09 is 11. Thus, the four fields of the data in the H register are respectively processed during four successive calculation and storage portions.

Table II illustrates the states of D counter stages D08–D12 for both the word 0 and word 1 times of each of the four circulations when D10, D09 is 01. It will be understood that during each of these word times, the D counter stages D04–D07 will count through 16 states and that each of these 16 states represents a particular bit time at which a particular one of 16 bits in the word defined by D08, D09, D10 is available at the H register output.

As represented in Table II, during circulation 0, a start condition is established in the apparatus of FIG. 8 by resetting the CALL BIT flip flop 394, resetting the AGE flip flop 392, resetting the MASTER CALL flip flop 382, and resetting the INITIALIZE flip flop 384. In addition, the state of the MASTER CALL flip flop 382 is read out prior to its being reset via gate 383 to either set or reset the selected output channel call flip flop (FIG. 1).

During circulation 1, word 0 time, the CALL BIT flip flop 394 is set to the state of the call bit stored in the H register by examining the H register output during bit 0 time. The AGE flip flop 392 is set if the age count emerging from the H register during bit times 1–15 exceeds a predetermined age count. For simplicity, it will be assumed that the AGE flip flop 392 is set if the bit out of the H register at bit time 14 is true.

During the circulation 1, word 0 time an initial borrow signal is supplied to the input of gate 366 at bit time 15 in accordance with the criteria represented in Table II. That is, an initial borrow signal will be produced in the event of an existing young call condition (CALL BIT flip flop true, AGE flip flop false). As previously pointed out, application of an initial borrow signal to the borrow input terminal 356 of the subtraction circuit 350 produces a difference equal to minuend minus (subtrahend +1).

During circulation 1, word 1 time, the output of the S register is applied to subtraction circuit input terminal 352. Subtrahend select gating 372 steers the output of the H register to input terminal 354. The difference produced at sutraction circuit output terminal 358 will either be $S-H_n$ if the initial borrow had been 0 or $S-(H_n+1)$ if the initial borrow had been 1. This difference is stored back into the H register via gates 370 and 372 as an intermediate result ($H_{INT}$).

The difference $H_{INT}$ is examined by the compare circuitry 380 in accordance with the criteria illustrated in Table II. If $H_{INT}$ is less than 0, then a call condition is indicated and the MASTER CALL flip flop 382 is set. If $H_{INT}$ is greater than TLQ, then the INITIALIZE flip flop 384 is set. If $H_{INT}$ is equal to or greater than 0 and equal to or less than TLQ, this required that an adapt process be performed during circulation 2.

Prior to proceeding with an explanation of the operations performed during circulation 2, it would be appropriate to discuss the significance of the decisions (1) and (2) made during circulation 1, word 1 time in terms of a vehicle entering over the area of a loop and in terms of some exemplary numbers.

Assume that the value of the historical reference $H_n$ is equal to the binary equivalent of 20,000 counts. Also assume that the window threshold number TLQ set by front panel switches 65 is equal to the binary equivalent of 15 counts. Now assume that a vehicle enters over the area of the loop thereby decreasing its inductance and increasing the loop oscillator frequency. This will of course reduce the time duration required to count 1,024 loop oscillator cycles. Thus, let it be assumed that the value of the current sample S is now equal to 19,980. The subtraction $S-H_n$ will thereby produce a difference of $-20$. Since this difference is negative, i.e. less than 0, the decision (1) represented in circulation 1, word 1 time of Table II is made and the MASTER CALL flip flop 382 is set.

Now suppose that a car has been stalled over a loop for a period of an hour. Under these circumstances, the WASH process, to be described below, will have changed the historical reference so as to make this vehicle a part of the background, thus permitting the loop to resume its function of detecting other vehicles which may enter the same loop. Now further assume that the stalled vehicle exits from the area over the loop thereby increasing the value of S. The criteria of decision (2) will be satisfied and the INITIALIZE flip flop 384 will be set which will subsequently produce an INITIALIZE process during circulation 2 to initialize the historical reference and thereby permit rapid response to a subsequently arriving vehicle.

If the value of S varies by small amounts within the threshold window, i.e., between 0 and TLQ, then it is desired that the system adapt to accommodate the small change by varying the historical reference slightly. This action takes place during circulation 2.

During circulation 2, word 0 time if the MASTER CALL flip flop 382 is true, the age count is incremented by one count. Otherwise, the age count is reset to all zeros. The age count is incremented by one by steering the H register output through the add one circuit 376 when the MASTER CALL flip flop 382 is true during a circulation 2, word 0 time.

During circulation 2, word 0, an initial borrow signal is developed during bit time 15 in accordance with the criteria shown in Table II. That is, if the INITIALIZE flip flop is false and if we have an existing call, evidenced by the CALL BIT flip flop 394 being true, then an initial borrow signal is developed. Also, if the INITIALIZE flip flop 384 is false and we have neither a previously existing call or a current call, then the initial borrow signal is also developed.

Subsequently, during circulation 2, word 1 time three different operations can occur depending upon the state of the INITIALIZE flip flop 384 and whether or not an initial borrow signal was input to the subtraction circuit 350 during bit 15 of the immediately preceding word 0 time. If the INITIALIZE flip flop is true, the subtrahend select gating 372 steers the threshold number TLQ to the input terminal 354 to develop the difference $S-TLQ$. It is pointed out that several practical values of TLQ are easily generated by merely supplying a true level to the input terminal 354 for a certain number of bit times. Thus, if a threshold number equal to three counts is desired, then TLQ should be true for bit times 0 and 1 of the 16 bit times of the word 1 interval. If it is desired that the threshold number be 15, then the signal TLQ is true throughout bit times 0, 1, 2 and 3. That is, it will be recognized that a 16 bit number having ones in the four least significant positions constitutes a binary number equal to the decimal number 15. It will be recalled that the threshold number TLQ is set either high or low by panel switch 65.

It will further be noted from Table II that during circulation 2, word 1 time, if the INITIALIZE flip flop is false and if an initial borrow signal was generated during the immediately preceding word 0 time, then the subtraction circuit 350 produces a difference $S-(H_{INT}+1)$. If the initial borrow signal was false, then the subtraction circuit 350 produces the difference $S-H_{INT}$.

Referring now to the following Table III, the four different processes are summarized so as to indicate the relationship between the new historical reference $H_{n+1}$ and the prior historical reference $H_n$.

TABLE III

| | | |
|---|---|---|
| INITIALIZE; | $H_{n+1} = S-TLQ$ | Circ 2, Wd 1; Operation (1) |
| ADAPT; | $H_{n+1} = H_n-1$ | Circ 1, Wd 1; Operation (1) |
| | | Circ 2, Wd 1; Operation (2) |
| WASH; | $H_{n+1} = H_n-1$ | Circ 1, Wd 1; Operation (1) |
| | | Circ 2, Wd 1; Operation (2) |
| NO WASH; | $H_{n+1} = H_n$ | Circ 1, Wd 1; Operation (2) |
| | | Circ 2, Wd 1; Operation (2) |

Note that the INITIALIZE process produce an historical reference equal to the difference between the current sample S and the threshold TLQ. Thus, if S equaled 20,000 counts and TLQ equaled 15, then the value of the new historical reference would equal 19,985. This new historical reference was formulated by operation (1) during circulation 2, word 1 time.

The ADAPT process produces a new historical reference which differs from the prior historical reference by one count. The new historical reference was developed by execution of operation (1) during circulation 1, word 1 time and operation (2) during circulation 2, word 1 time.

The WASH process also produces a new historical reference equal to the prior historical reference reduced by a count of one. The operations required are the same as in the ADAPT process. However, note that the WASH process is initiated only after a call is old. That is, briefly refer back to circulation 1, word 0 time illustrated in Table II. Note that when the call bit is 0 and the age is 0, then the initial borrow is also 0. This represents the condition under which the historical reference will be modified for the ADAPT process. On the other hand, the WASH process is represented when both the CALL BIT flip flop and AGE flip flop are true.

Again referring to Table III, it will be noted that the NO WASH process produces a new historical reference equal to the preceding historical reference. This represents the situation in which we have a call condition which is not yet old. This historical reference is maintained as a consequence of the performance of operation (2) during circulation 1, word 1 and operation (2) during circulation 2, word 1. However, it should further be noted that the effect of operation (2) during circulation 1 is to reduce $H_{INT}$ by one count prior to the count being restored during operation (2) of circulation 2. The effect of this reduction of $H_{INT}$ is to slightly increase sensitivity once a call is established in order to hold the call and prevent chattering.

It should be recognized that as a consequence of the foregoing operation, when no calls exist and in the absence of arriving vehicles, the value of the historical reference will be continually reduced by one count each calculation and storage portion. As the historical reference is reduced, the intermediate value $H_{INT}$ is correspondingly increased and after a certain number of scan cycles without a call occurring, the value $H_{INT}$ will exceed the threshold TLQ. At this point of course, the INITIALIZE process will occur to reestablish the historical reference in terms of the current sample and the defined threshold number TLQ.

It was previously mentioned that a system in accordance with the present invention is capable of operating in either a PULSE mode or a PRESENCE mode, dependent upon the position of the mode switch 69. The mode switch position functions to couple either a true or false logic level signal to the logic network input terminal 68 (FIG. 1). It has been assumed that a false signal defines the PRESENCE mode. The explanation of the calculation and storage portion with references to Tables II and III and FIG. 8 has thus far assumed operation in the PRESENCE mode. Operation in the PRESENCE mode assures that the output channel call flip flop stays true for a duration corresponding to the period of vehicle presence over a loop. Thus, if a vehicle arrives over a loop and parks for twenty minutes, the call flip flop on the associated channel will stay true for that full twenty minute duration. In the PULSE mode of operation, it is desired that each new vehicle produce a short output pulse, e.g., of 225 millisecond duration. In the PULSE mode of operation, even if the vehicle parks over the loop, its effect is to make the output channel call flip flop true for only 225 milliseconds, i.e., the duration of one scan cycle.

Operation during the PULSE mode is identical to operation during the PRESENCE mode except that during the PULSE mode, the MASTER CALL flip flop 382 of FIG. 8 is reset during circulation 2, word 0 time if there is an existing call. More particularly, attention is now directed to the following Table IV and to FIG. 10. Table IV illustrates an additional action which takes place during circulation 2, word 0 time based on the condition of the MASTER CALL flip flop, the CALL BIT flip flop, and the defined mode.

TABLE IV (PULSE MODE)

|  | D12 | D11 | D10 | D09 | D08 |
|---|---|---|---|---|---|
| Circ 2, Wd 0 | 1 | 0 | 0 | 1 | 0 |
|  | CONDITION | | | ACTION | |
| PULSE | MAS CALL | CALL BIT | Reset MASTER CALL FF, | | |
| 1 | 1 | 1 | Bit 2 Time | | |

Recall that in discussing operation during the PRESENCE mode with reeference to Table II, it was pointed out that the CALL BIT flip flop 394 was set during circulation 1, word 0 if there was an existing call and that the MASTER CALL flip flop 382 was set during circulation 1, word 1 in the event of a new or continuing call condition. During circulation 2, word 0 if the PULSE mode is defined, and if both the MASTER CALL flip flop 382 and the CALL BIT flip flop 394 are true, then the MASTER CALL flip flop is reset. The gate for resetting the MASTER CALL flip flop during circulation 2, word 0 time is illustrated in FIG. 10 as gate 400. As a consequence of resetting the MASTER CALL flip flop 382 during circulation 2, word 0 time, it will be false during circulation 0 time of the following calculation and storage portion when the state of the MASTER CALL flip flop 382 is transferred to the output channel call flip flop. Accordingly, when the PULSE mode is defined, the output channel call flip flop is set only during the first scan cycle in which the arriving vehicle is recognized.

To this point in the specification, we have merely assumed that a single roadway loop is connected to each loop input circuit 51. In actuality however, multiple roadway loops can be connected to each loop input circuit. For example, assume a north/south roadway having three traffic lanes in each direction and a left turn lane in each direction. A four channel embodiment in accordance with the present invention can be utilized such that the first channel monitors the north-going traffic lanes, the second channel monitors the south-going traffic lanes, the third channel monitors the north-going left turn lane, and the fourth channel monitors the south-going left turn lane. In this configuration, it is desirable that each of the first and second channels monitor three lanes. Usually, in practice a different loop is installed in each lane. The three loops on a common channel would normally be connected in series.

In accordance with a significant aspect of the inventin, when operating in the PULSE mode, it is desirable that if a vehicle remains over a loop for more than a certain interval, e.g., two seconds, that the system "tune out" the recognition of that stalled vehicle so that it can respond to the other loops connected on the same channel. In order to do this, an additional magnitude compare means 402 (FIG. 11) is provided for responding to an age count greater than some predetermined rephase period (e.g., two seconds) to force an INITIALIZE process. More particularly, it will be recalled that the age count is available at the output of the H register during circulation 1, word 0. Accordingly, when the PULSE mode is defined, then the magnitude compare means 402 compares the age count during circulation 1, word 0 time with a count representative of the rephase period desired. If the age count is greater than the rephase period, then the INITIALIZE flip flop 384 (FIG. 8) is set.

From the earlier description of Table II and FIG. 8, it will be recalled that when the INITIALIZE flip flop is set, an INITIALIZE process occurs which replaces the stored historical reference with a new historical reference equal to S—TLQ. Thus, by initiating the INITIALIZE process after a two second interval, the system essentially instantly adapts to the environment including the presence of the stalled vehicle over one of the loops so as to enable it to respond to vehicles passing over other loops on the same channel.

It will be recalled that in initially discussing FIG. 1, reference was made to three sets of panels switches which respectively provided logic level inputs to the logic network input terminals 64, 66, and 68. It has been mentioned that the logic level applied to input terminal 64 defines either a high or low threshold number TLQ. This has already been discussed and in a preferred embodiment of the invention, the number TLQ is either the binary equivalent of 15 counts for a single small loop where low sensitivity is desired, or the binary equivalent of 3 counts for multiple or large loops where a higher sensitivity is appropriate. The function of switches 69 has also been discussed as applying a true logic level to input terminal 68 to define the PULSE mode of operation.

The switches 67 connected to the input terminal 66 of the logic network selectively define either a high or normal system sensitivity by essentially defining the overflow count of the L counter of FIG. 5. More particularly, it will be recalled that in the description of FIG. 5, the time duration required for the L counter to count to 1,024 was measured. For this purpose, stage L10 going true was used to transfer the contents of the D counter to the S register. In order to decrease system sensitivity, a lesser number of counts can be used. Thus, in accordance with a further feature of the invention, the logic circuit of FIG. 12 is provided to develop the signal $L_{FULL}$. The logic circuit illustrated in FIG. 12 enables the system to respond either to an overflow out of L counter stage L09 or L10 depending upon the position of the active panel switch 67. The signal $L_{FULL}$ is developed by NAND gate 420 and is connected to all of the input terminals identified as L10 in FIG. 5.

The logic circuit of FIG. 12 includes NAND gates 422 and 424, and an inverter 426. The output of L counter stage L10 is applied to the input of inverter 426. The output of L counter stage L09 is coupled to the input of NAND gates 422 and 424. The second input to NAND gate 422 is derived from the panel switches 67 which can be set for either normal or high sensitivity. Let it be assumed that when a switch is set to normal sensitivity, it applies a true logical signal to input terminal 428 of NAND gate 422.

The second input to NAND gate 424 is derived from the output of gate 290 of FIG. 5. The function of gate 424 is to maintain $L_{FULL}$ true through the calculation and storage portion when normal sensitivity is selected by panel switch 67.

In order to understand the operation of the logic circuit of FIG. 12, assume initially that the active sensitivity switch 67 is set at high meaning that a false signal is applied to gate input terminal 428. For high sensitivity, it is necessary that the system of FIG. 5 respond to L counter stage L10 overflowing as was previously described. During the period measurement portion when stages L09 and L10 are both false, the output of gates 422 and 424 and inverter 426 will all be true meaning that the output of gate 420 will be false. When stage L09 becomes true, this will have no effect on the output of gate 422 and accordingly gate 420 will remain false. However, when stage L10 becomes true, the output of inverter 426 will go false thereby producing a true output at the gate of 420. This operation is consistent with that previously described with reference to FIG. 5.

Now however assume that the active switch 67 is set to normal sensitivity applying a true logic level signal to gate input terminal 428. During the period measurement portion when both stages L09 and L10 are false, gates 422 and 424 and inverter 426 will provide true outputs meaning that the output of gate 420 will be false. However, when stage L09 becomes true, the output of gate 422 will switch false thereby switching the output of gate 420 true. Thus, by defining a normal sensitivity via panel switch 67 to produce a true input to gate 422, the signal $L_{FULL}$ will be generated when stage L09 goes true rather than when stage L10 goes true.

It has thus far been assumed that during an ADAPT or WASH process, the stored historical reference is modified by one count during each scan cycle and a scan cycle has been assumed as being defined by one cycle of the D counter. In order to enable the rate of modification of the historical reference to be varied so that, for example, it can be incremented once every four or eight scan cycles, the D counter can be extended as is represented in FIG. 13. More particularly, FIG. 13 illustrates the D counter as including five additional stages D19–D23 which together function to count every four scan cycles. Thus, by responding to selected states of stages D19–D23, the rate of modification of the historical reference can be selected. For example only, to increment the historical reference during only two out of every four cycles in the ADAPT process, it is merely necessary to gate the output of stage D19 so that the ADAPT operations represented in Table III are executed only when D19 is true. Different rates of course can be selected for the ADAPT and WASH processes and these rates can be made dependent on the positions of the panel switches. Thus, as an example, when high sensitivity or single small loop configuration is selected, it is generally desired to adapt more slowly during the ADAPT process.

Attention is now directed to FIG. 14 which illustrates a preferred embodiment of loop oscillator 50 and input circuit 51 (FIG. 1).

The loop oscillator 50 is comprised of a transistor Q1 illustrated as being of the PNP type having its base connected to a reference voltage defined by resistors R1 and R2 connected in series between a source of positive potential and ground. The transistor Q1 is connected in a Colpitts configuration with the capacitors C1 and C2 defining the load capacitance and with the loop input circuits 51 defining the load inductance. It is desired that the oscillator 50 provide a fixed amplitude signal to the loop input circuit over a wide range of inductance and frequencies. For this purpose, a current regulating transistor Q2 is connected between the emitter of transistor Q1 and the source of positive potential. More particularly, the emitter of NPN transistor Q2 is connected through resistor R3 to the emitter of transistor Q1. The collector of transistor Q2 is connected to the source of positive potential. The potential on the base of transistor Q2 is controlled by the transistor Q3 which in turn is responsive to the peak potential on the collector of transistor Q1. Thus, the base of NPN transistor Q3 is connected to the collector of transistor Q1. The emitter of transistor Q3 is connected to a fixed voltage point and the collector of transistor Q3 is connected through an RC network comprised of resistor R4 and capacitor C3 to a source of positive potential. The feedback path comprised of transistor Q3 responsive to the peak-to-peak voltage swing at the collector of transistor Q1 controls the emitter current to transistor Q1 by varying the potential at the base of transistor Q2.

As is well known, the frequency of oscillation is dependent upon the load inductance seen by the oscillator 50. The collector of the oscillator transistor Q1 is connected to a first input terminal of each of the loop input circuits 51. Only one loop input circuit is shown in detail but the others are identical. Each loop input circuit includes a bidirectional electronic switch 500 comprised of NPN transistors 502 and 504. A channel select line is connected through resistors to the bases of the transistors 502 and 504. As previously discussed, an enabling voltage is applied to only one of the channel select lines at a time so that the electronic switch 500 in only one of the loop input circuits is active at any one time. As shown, the collector of oscillator transistor Q1 is connected through the switch 500 to a first terminal of a transformer primary winding 506. The second terminal 508 of the transformer primary winding is connected to the ground side of the capacitor C2. The transformer secondary winding 510 is connected to the roadway loop or loops.

The waveform appearing at the collector of transistor Q1 will be substantially a sine wave at a frequency determined by the inductance seen by the active loop input circuit. Differential amplifier 512 produces a square wave output constituting the loop signal applied to gate 218 (FIG. 5) for counting by the L counter 100.

By transformer coupling the roadway loops to the loop oscillator circuit 50, certain significant functions are achieved including: (1) common mode and differential lightning protection; (2) grounds isolation; (3) common mode and low frequency noise rejection. Common mode lightning voltages are held off by the primary to secondary insulation of the input transformer. Differential lightning protection is afforded by the protective circuit comprised of the neon tube 518, Zener diodes 520, and the transformer leakage inductance. Grounds isolation and common mode noise rejection are the products of the basic transformer action. The limited pass band of the transformer contributes low frequency noise rejection.

Reference is again made to the power monitor 60 of FIG. 1 which functions to monitor the supply voltage to detect supply voltage variations beyond certain limits. In the event a variation is detected, the power monitor circuit 60 supplies a true logic level signal on logic network input terminal 62. This action forces the INITIALIZE flip flop 384 of FIG. 8 true to force the performance of an INITIALIZE process as aforedescribed.

From the foregoing, it should now be appreciated that an improved vehicle detection apparatus has been disclosed herein capable of energizing and monitoring multiple independent inductive loop channels.

The embodiments of the invention in which an exclusive property or privilege is claimed are defined as follows:

1. Apparatus useful in conjunction with a plurality of wire loops each supported adjacent a different area of a roadway surface for detecting the presence of a vehicle on each of said areas, said apparatus comprising:
   oscillator circuit means;
   timing means defining a plurality of sequential phases;
   switching means for coupling said oscillator circuit means to a different loop during each of said phases;
   period measurement means for measuring the period of a defined number of cycles of said oscillator circuit means during each of said phases;
   first digital storage means storing a plurality of reference numbers each corresponding to a different one of said phases;
   a plurality of output devices; and
   first means for comparing the relative magnitude of the period measured during each phase with the stored reference number corresponding to that phase for selectively supplying a call signal to a different one of said output devices during each phase.

2. The apparatus of claim 1 wherein said timing means includes a source of timing pulses and cyclic digital counter means for counting said timing pulses to define during each cycle a plurality of unique digital states comprised of sequential groups of successive states, each group defining one of said phases.

3. The apparatus of claim 2 wherein said period measurement means includes a first counter means for counting cycles of said oscillator circuit means; and
   second digital storage means for storing the count accumulated by said cyclic digital counter means during the interval said first counter means is counting said defined number of cycles.

4. The apparatus of claim 1 wherein said oscillator circuit means includes:
   a first transistor having a base, collector and emitter;
   a second transistor having a base, collector and emitter;
   means connecting said first transistor collector-emitter path in series with said second transistor collector-emitter path;
   feedback circuit means responsive to the peak voltage at said first transistor collector for varying the voltage at said second transistor base to maintain said peak voltage substantially constant; and
   means connecting said first transistor collector-emitter path to said switching means.

5. The apparatus of claim 1 wherein said switching means includes a plurality of input circuits each for connecting said oscillator circuit means to a different loop;
   each of said input circuits including a transformer having primary and secondary windings, the secondary winding of each input circuit being connected to a different one of said plurality of loops.

6. The apparatus of claim 5 wherein each input circuit further includes electronic switch means coupling the primary winding thereof to said oscillator circuit means.

7. Apparatus useful in conjunction with a plurality of wire loops each supported adjacent a different area of a roadway surface for detecting the presence of a vehicle on each of said areas, said apparatus comprising:
oscillator circuit means;
a source of timing pulses;
cyclic digital counter means responsive to said timing pulses for defining a plurality of sequential phases during each cycle;
switching means for coupling said oscillator circuit means to a different loop during each of said phases;
period measurement means including a first counter means for counting a defined number of cycles of said oscillator circuit means during each of said phases;
sample storage means for storing a sample count accumulated during each phase by said cyclic digital counter means during the interval said first counter means is counting said defined number of cycles of said oscillator circuit means;
reference storage means storing a plurality of reference counts, each corresponding to a different one of said phases;
arithmetic means for determining the difference between the sample count accumulated during a phase and the corresponding stored reference count; and
first means responsive to the value of each difference determined by said arithmetic means for selectively generating a call signal.

8. The apparatus of claim 7 including second means responsive to the value of each difference determined by said arithmetic means for selectively modifying the stored reference count corresponding thereto.

9. The apparatus of claim 7 including means defining first and second threshold counts; and wherein said first means is responsive to each difference having a value to a first side of the range defined between said first and second threshold counts.

10. The apparatus of claim 9 including second means responsive to each difference having a value within said range for incrementally varying the stored reference count corresponding thereto.

11. The apparatus of claim 10 including third means responsive to each difference having a value to a second side of said range for generating a new reference count and replacing the stored reference count corresponding thereto with said new reference count.

12. The apparatus of claim 11 wherein said means for generating said new reference count includes means responsive to the sample count corresponding thereto.

13. Apparatus including oscillator circuitry adapted to be operatively connected to a remote inductive loop for monitoring the frequency of oscillation, said apparatus comprising:
means for measuring the time duration of a defined number of cycles of said oscillator circuitry;
digital storage means storing a reference duration;
means for determining the difference between said measured time duration and said stored reference duration;
means for determining whether said difference is within a range defined by first and second threshold numbers;
means responsive to said difference being to a first side of said range for generating a call signal;
means responsive to said difference being within said range for selectively incrementally varying said stored reference duration; and
means responsive to said difference being to a second side of said range for generating a new reference duration and replacing said stored reference duration in said storage means with said new reference duration.

14. The apparatus of claim 13 wherein said means for generating said new reference duration includes means responsive to said measured time duration for generating a new reference duration related to said measured time duration.

15. The apparatus of claim 13 wherein said means for measuring time duration includes:
a first counter means for counting said oscillations;
a stable oscillator supplying timing pulses; and
a second counter means for counting said timing pulses.

16. The apparatuus of claim 15 wherein said second counter means comprises a cyclic digital counter defining successive cycles, each cycle comprised of a plurality of unique digital states; and wherein
said means for determining said difference is operative during each cycle at a time coincident with said second counter means defining particular ones of said digital states.

17. The apparatus of claim 13 including
age count means for developing an age count representative of the time duration during which said call signal is generated;
means defining an age threshold; and
means responsive to the generation of said call signal and said age count exceeding said age threshold for incrementally varying said stored reference duration.

18. The apparatus of claim 13 including timing means defining successive cycles;
a first binary storage device; and
means for setting said first binary storage device during each successive cycle to a first state in response to the generation of said call signal and to a second state in response to the absence of a call signal whereby said first binary storage device will remain in said first state for so long as said call signal is generated during each successive cycle.

19. The apparatus of claim 18 including means for defining a PULSE mode;
a second binary storage device; and
means for setting said second binary storage device during each successive cycle to a first state only in response to the generation of said call signal and to said first binary storage device being in said second state.

20. The apparatus of claim 13 wherein said means for storing a new reference duration includes means responsive to an initialize command signal;
age count means for developing an age count representative of the time duration during which said call signal is generated;
means defining a rephase count; and
means responsive to said age count means defining a count exceeding said rephase count for generating said initialize command signal.

21. The apparatus of claim 13 wherein said means for storing a new reference duration includes means responsive to an initialize command signal;

power means supplying a predetermined voltage level; and monitoring means responsive to variations in said voltage level for generating said initialize command signal.

22. Apparatus including oscillator circuitry adapted to be operatively connected to a remote inductive loop for monitoring the frequency of oscillation, said apparatus comprising:

timing means defining successive cycles;

period measurement means for measuring during each successive cycle the time duration (S) of a certain number of oscillations;

digital storage means storing a reference duration (H);

means for determining the difference (S–H) between each measured time duration and said stored reference duration;

means defining a threshold number (T);

means responsive to (S–H) < for generating a call signal;

means responsive to $0 \leq (S-H) \leq T$ for incrementally varying said stored reference duration; and means responsive to (S–H) > T for storing a new reference duration in said storage means equal to (S–T).

23. The apparatus of claim 22 including switch means for selectively defining the value of said threshold number.

24. The apparatus of claim 22 wherein said period measurement means includes a first counter means for counting said oscillations;

a stable oscillator supplying timing pulses; and a second counter means for counting the number of timing pulses supplied during the interval said first counter means is counting said certain number of oscillations.

25. The apparatus of claim 24 including switch means for selectively defining the value of said certain number of oscillations.

26. The apparatus of claim 22 including age count means for developing an age count representative of the time duration during which said call signal is generated;

means defining an age threshold; and means responsive to the generation of said call signal and said age count exceeding said age threshold for incrementally varying said stored reference duration.

27. The apparatus of claim 22 including a first binary storage device; and means for setting said first binary storage device during each successive cycle to a first state in response to the generation of said call signal and to a second state in response to the absence of a call signal whereby said first binary storage device will remain in said first state for so long as said call signal is generated during each successive cycle.

28. The apparatus of claim 27 including means for defining a PULSE mode;

a second binary storage device; and means for setting said second binary storage device during each successive cycle to a first state only in response to the generation of said call signal and to said first binary storage device being in said second state.

29. The apparatus of claim 22 wherein said means for storing a new reference duration includes means responsive to an initialize command signal;

age count means for developing an age count representative of the time duration during which said call signal is generated;

means defining a rephase count; and means responsive to said age count means defining a count exceeding said rephase count for generating said initialize command signal.

30. The apparatus of claim 22 wherein said means for incrementally varying includes means for reducing said stored reference duration (H) to increase said difference (S–H) toward said threshold number (T).

31. The apparatus of claim 22 wherein said means for storing a new reference duration includes means responsive to an initialize command signal;

power means supplying a predetermined voltage level; and monitoring means responsive to variations in said voltage level for generating said initialize command signal.

32. Apparatus useful in conjunction with a plurality of wires loops each supported adjacent a different area of roadway surface for detecting the presence of a vehicle on each of said areas, said apparatus comprising:

oscillator circuit means; and a plurality of input circuits each connecting said oscillator circuit means to a different one of said plurality of loops;

each of said input circuits including a transformer having primary and secondary windings, the secondary winding of each input circuit being connected to a different one of said plurality of loops; and each of said input circuits further including an electronic switch means coupling the primary winding thereof to said oscillator circuit means.

33. The apparatus of claim 32 wherein said oscillator circuit means includes:

a first transistor having a base, collector and emitter;

a second transistor having a base, collector and emitter;

means connecting said first transistor collector-emitter path in series with said second transistor collector-emitter path;

feedback circuit means responsive to the peak voltage at said first transistor collector for varying the voltage at said second transistor base to maintain said peak voltage substantially constant; and means connecting said first transistor collector-emitter path to said switching means.

34. The apparatus of claim 1 including second means for comparing the relative magnitude of the period measured during each phase with the stored reference number corresponding to that phase for selectively modifying that stored reference number.

35. The apparatus of claim 1 including abort means actuatable in response to a predetermined characteristic of said oscillator circuit means for allowing said timing means to define a subsequent phase.

36. The apparatus of claim 1 including abort means actuatable in response to a predetermined characteristic of said period measurement means for allowing said timing means to define a subsequent phase.

37. The apparatus of claim 36 including alarm means actuatable in response to the actuation of said abort means.

38. The apparatus of claim 7 including abort means actuatable in response to a predetermined characteristic of said oscillator circuit means for allowing said cyclic digital counter means to define a subsequent phase.

39. The apparatus of claim 7 including abort means actuatable in response to a predetermined characteristic of said period measurement means for allowing said cyclic digital counter means to define a subsequent phase.

40. The apparatus of claim 39 including alarm means actuatable in response to the actuation of said abort means.

41. Apparatus useful in conjunction with a plurality of wire loops connected to circuitry for producing an oscillating signal therein, each loop supported adjacent a different area of a roadway surface for detecting the presence of a vehicle on each of said areas, said apparatus comprising:

timing means defining a plurality of sequential phases;

period measurement means for measuring during each of said phases, the period of a defined number of cycles of the oscillating signal in one of said loops;

first digital storage means storing a plurality of reference numbers each corresponding to a different one of said loops;

a plurality of output devices each associated with a different one of said loops; and first means for comparing the period measured for each loop with a stored reference number corresponding to that same loop for selectively supplying a call signal to the output device associated with that loop.

42. The apparatus of claim 41 including second means for comparing the period measured for each loop and the stored reference number corresponding to that same loop for selectively modifying that stored reference number.

* * * * *